United States Patent [19]

Miyazaki et al.

[11] Patent Number: 4,849,664
[45] Date of Patent: Jul. 18, 1989

[54] LINEAR MOTOR CAR SYSTEM

[75] Inventors: Toshimasa Miyazaki, Yokohama; Yoji Uzawa; Kazuyoshi Okawa, both of Hachioji; Hiroshi Kawashima, Ebina; Kazumasa Moriya, Urawa; Yoshitaka Murakawa, Fuchu; Toshimitsu Kumagai; Akihiro Nakamura, both of Kawasaki; Motohiko Itoh, Tokyo; Tomoyuki Kashiwazaki, Kawasaki, all of Japan

[73] Assignee: Fujitsu Limited, Kawasaki, Japan

[21] Appl. No.: 895,122

[22] Filed: Aug. 11, 1986

[30] Foreign Application Priority Data

Aug. 14, 1985 [JP] Japan .................... 60-178964
Oct. 15, 1985 [JP] Japan .................... 60-227853
Jan. 20, 1986 [JP] Japan .................... 61-009503
Jan. 20, 1986 [JP] Japan .................... 61-009505
Jan. 31, 1986 [JP] Japan .................... 61-019368

[51] Int. Cl.⁴ ............................... H02K 41/00
[52] U.S. Cl. ............................... 310/12; 104/290; 318/135; 324/208
[58] Field of Search ............ 310/12-14, 310/15; 318/38, 37, 135, 34; 104/290, 292, 295; 324/208

[56] References Cited

U.S. PATENT DOCUMENTS

| 3,675,585 | 7/1972 | Wiart | 318/135 X |
| 3,736,880 | 6/1973 | Ross | 318/135 X |
| 3,874,301 | 4/1975 | Alimanestianu . | |
| 3,974,778 | 8/1976 | Black et al. . | |
| 4,055,123 | 10/1977 | Heidelberg . | |
| 4,068,152 | 1/1978 | Nakamura et al. . | |
| 4,348,618 | 9/1982 | Nakamura et al. | |
| 4,463,290 | 7/1984 | Asakawa et al. . | |
| 4,620,087 | 10/1986 | Aizaki . | |
| 4,638,434 | 1/1987 | Aizaki . | |
| 4,665,349 | 5/1987 | Matsuo | 318/135 |
| 4,675,582 | 6/1987 | Hommes et al. | 318/135 X |
| 4,721,045 | 1/1988 | Okawa et al. | 318/38 |

FOREIGN PATENT DOCUMENTS 23108120 9/1973 Fed. Rep. of Germany .
3402143 8/1984 Fed. Rep. of Germany .
33319530 4/1985 Fed. Rep. of Germany .

OTHER PUBLICATIONS

Asakawa et al.; "Small Conveyer for Inter-Office Transport-Development of Linear Induction Motor"; Fujitsu Scientific and Technical Journal; Dec. 1980; pp. 37-57; Kawasaki, Japan.

Primary Examiner—R. Skudy
Attorney, Agent, or Firm—Staas & Halsey

[57] ABSTRACT

A linear motor car system including a horizontal conveyance path, a vertical conveyance path, and a curved conveyance path connected between the horizontal and vertical conveyance paths. A controller in the linear motor car system drives a carrier so that the carrier can ascend smoothly up the curved and vertical conveyance paths with the minimum driving energy and without accidentally falling back down the vertical path.

13 Claims, 25 Drawing Sheets

4-TH EMBODIMENT

5-TH EMBODIMENT

6-TH EMBODIMENT

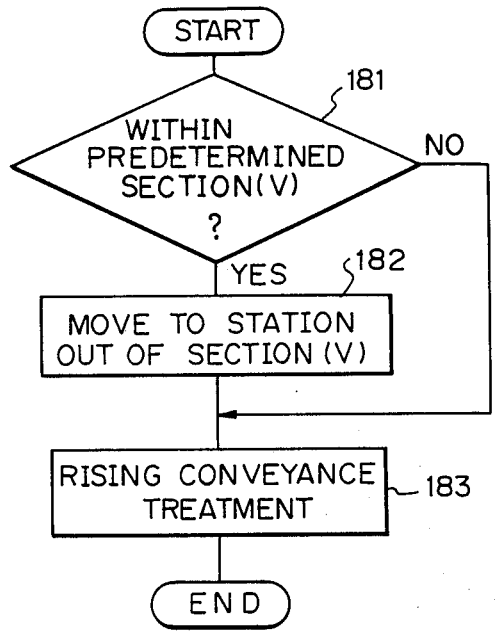
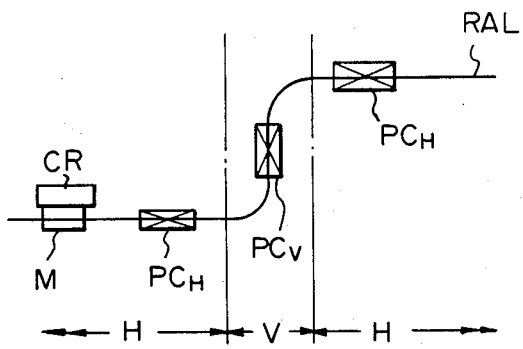

9-TH EMBODIMENT

LINEAR MOTOR CAR SYSTEM

BACKGROUND OF THE INVENTION

1. Field of the Invention

The present invention relates to a linear motor car system. More particularly, it relates to a carrier control system along a vertical conveyance path.

The linear motor car system has recently attracted favorable attention as an article conveying means because a power source need not be loaded on a carrier as a conveyor. The linear motor car system is very suitable for the transportation of small-size light-weight articles in an office, and the use of this system is now expanding.

In the linear motor car system, stator blocks of a linear motor are arranged along a conveyance path (rail). A mover of the linear motor is attached to a carrier and the carrier is placed on the conveyance path. The stators are excited to kick the mover, and in turn the carrier, so that the carrier is moved by inertia between adjacent stators. When the carrier arrives at the subsequent stator, the stator is excited to kick the carrier. And thus, the stators are sequentially excited to move the carrier to its destination on the conveyance path.

Such linear motor car system is used, for example, as a cash conveyance system between a window and a cash handling part in a bank. If the window and the cash handling part are on the same floor of a building of the bank, the conveyance path can be substantially horizontal as a whole, although certain undulations in the path are inevitable. But, if the window and the cash handling part are located on different floors, a vertical conveyance zone is included in the conveyance path.

2. Description of the Related Art

In a conventional linear motor car system, the conveyance path is generally arranged in a substantially horizontal plane, including certain inevitable undulations, but it is not applied to a portion including a large vertical distance, for example, a distance extending from the first floor to the second floor of a building. If the conveyance path is arranged on a long, gently inclined plane, a large vertical distance can be covered, but the space required is increased. Accordingly, a steep inclination is preferred and a vertical path is especially preferred. As the vertical delivery means, conventionally a vertical moving system is often adopted wherein a rack-pinion system or a chain-belt system is used.

In this conventional system, however, different types of driving are necessary for the horizontal conveyance zone and vertical conveyance zone, respectively, and the structure becomes complicated either mechanically or electrically. Furthermore, in the vertical conveyance zone, the carrier is once stopped, then raised or brought down and started again. Accordingly, a time loss is inevitably incurred.

SUMMARY OF THE INVENTION

An object of the present invention is to provide a linear motor car system having a simplified and low-cost conveyance path structure.

Another object of the present invention is to provide a linear motor car system and a method for the control thereof, in which the carrier can move along both a horizontal conveyance path and a vertical conveyance path without stopping the carrier at the joining portion between the horizontal conveyance path and the vertical conveyance path.

Still another object of the present invention is to provide a linear motor car system and a method for the control thereof, in which an accidental fall of the carrier in the vertical conveyance path region can be prevented.

A still further object of the present invention is to provide a linear motor car system and a method for the control thereof, in which the energy needed to raise the carrier along the vertical conveyance path can be minimized.

Still another object of the present invention is to provide a linear motor car system and a method for the control thereof, in which a complete ascension of the carrier, from a lower horizontal conveyance path to the upper horizontal conveyance path through the vertical conveyance path, is ensured.

According to the present invention, there is provided a linear motor car system having a conveyance path and a linear motor. The linear motor comprises a plurality of stators dispersedly arranged along the conveyance path and a moving element. The moving element is attached to a carrier and the carrier is driven to run along the conveyance path by exciting the stators. The carrier is made to coast by an inertial force between adjacent stators. The conveyance path comprises a lower horizonal conveyance path, an upper horizontal conveyance path, a vertical conveyance path, a lower curved conveyance path connected between said vertical conveyance path and said lower horizontal conveyance path, and an upper curved conveyance path connected between said vertical conveyance path and said upper horizontal conveyance path. At least one of the stators is arranged on the end portion of one of the lower horizontal conveyance path, the vertical conveyance path, and the upper horizontal conveyance path and the end portion is connected to the lower curved conveyance path or to the upper curved conveyance path. Accordingly, the carrier is movable through the lower curved conveyance path or the upper curved conveyance path by an inertial force.

According to one aspect of the present invention, the linear motor car system further comprises a control unit for driving and controlling the linear motor. The control unit has means to generate a control signal supplied to the stators so that only an upward driving force is generated in the moving element when the carrier is running along the vertical conveyance path, between at least one of the stators and the moving element.

According to another aspect of the present invention, the control unit comprises a discriminating means for discriminating whether or not the carrier ascending along the vertical conveyance path will be able to rise completely ascend the vertical conveyance path, and comprises a gradual descent control means for driving the carrier to gradually descend.

According to a further aspect of the present invention, the control unit comprises an abnormal descent detecting means for detecting whether or not the carrier has erroneously intruded from the upper horizontal conveyance path onto the vertical conveyance path, and comprises an exciting means for exciting the stators disposed along the vertical conveyance path so that the carrier is braked when the abnormal descent detecting means detects an erroneous intrusion of the carrier.

According to still another aspect of the present invention, the control unit comprises an ascent failure detecting means, for detecting a failure of the carrier to ascend the vertical conveyance path, and a driving means for driving the carrier so as to make it intrude again into the vertical conveyance path at a speed higher than the speed of the intrusion into the vertical conveyance path at the time of the failure to ascend.

According to a still further aspect of the present invention, the control unit comprises a starting-position detecting means for detecting whether or not the starting position of the carrier is within a predetermined approach section on the lower horizontal conveyance path, and comprises a withdrawal means for withdrawing the carrier to a position where at least a predetermined minimum approach distance can be obtained, when the carrier is within the predetermined approach section.

According to yet another aspect of the present invention, there is provided a linear motor car system for travelling a carrier along a conveyance path including a horizontal conveyance zone and a vertical conveyance zone by using a linear motor, wherein driving energies $E_H$ and $E_V$ given to the carrier by the linear motor in the horizontal conveyance zone and the vertical conveyance zone, respectively, satisfy the requirement of $E_H < E_V$.

According to the present invention, there is further provided a method for controlling a linear motor car system comprising a conveyance path including a vertical conveyance path, a carrier moved on the conveyance path to convey an article, a linear motor for the carrier, and a controller for controlling the linear motor. The method is characterized in that in the vertical conveyance path, the controller generates only a driving force for driving the carrier upward in the linear motor.

According to a still further aspect of the invention, the method further comprises the steps of discriminating whether or not the carrier ascending the vertical conveyance path will be able to completely ascend the vertical conveyance path, and driving the carrier to gradually descend along the vertical conveyance path when it is discriminated that the carrier cannot completely ascend the vertical conveyance path.

According to still another aspect of the present invention, the discriminating step comprises the steps of: detecting the ascent speed of the carrier along the vertical conveyance path, comparing the detected ascent speed with a predetermined reference speed value, and applying to the carrier an upward direction force smaller than the force of gravity acting on the carrier when the detected ascent speed is smaller than a predetermined reference speed.

According to yet another aspect of the present invention, the discriminating step comprises the steps of detecting the ascent acceleration of the carrier along the vertical conveyance path, comparing the detected ascent acceleration with a predetermined reference acceleration value, and applying an upward direction force smaller than the force of gravity acting on the carrier when the detected ascent acceleration is smaller than a predetermined reference acceleration.

According to a still further aspect of the present invention, the method further comprises the steps of detecting a failure of the carrier to ascend the vertical conveyance path, and driving the carrier so as to intrude again into the vertical conveyance path at a speed higher than the speed of the intrusion into the vertical conveyance path at the time of the failure to ascend.

According to a further aspect of the present invention, the method further comprises the steps of detecting whether or not the starting position of the carrier is within a predetermined approach section, and withdrawing the carrier to a position at which at least a predetermined minimum approach distance can be obtained, when the carrier is within the predetermined approach section.

BRIEF DESCRIPTION OF THE DRAWINGS

The above objects and features as well as other features of the present invention will be more apparent from the following description of the preferred embodiments, with reference to the accompanying drawings, wherein:

FIG. 18 is a flow chart explaining a withdrawal of a carrier to obtain a sufficient rising speed, according to the seventh embodiment of the present invention;

FIG. 24 is a diagram of a secondary conductor movable type linear motor car system according to a first example of the ninth embodiment of the present invention.

DESCRIPTION OF THE PREFERRED EMBODIMENTS

For a better understanding of the present invention, the background and prior art of the present invention will first be described with reference to FIGS. 1 to 4.

Figure 1:
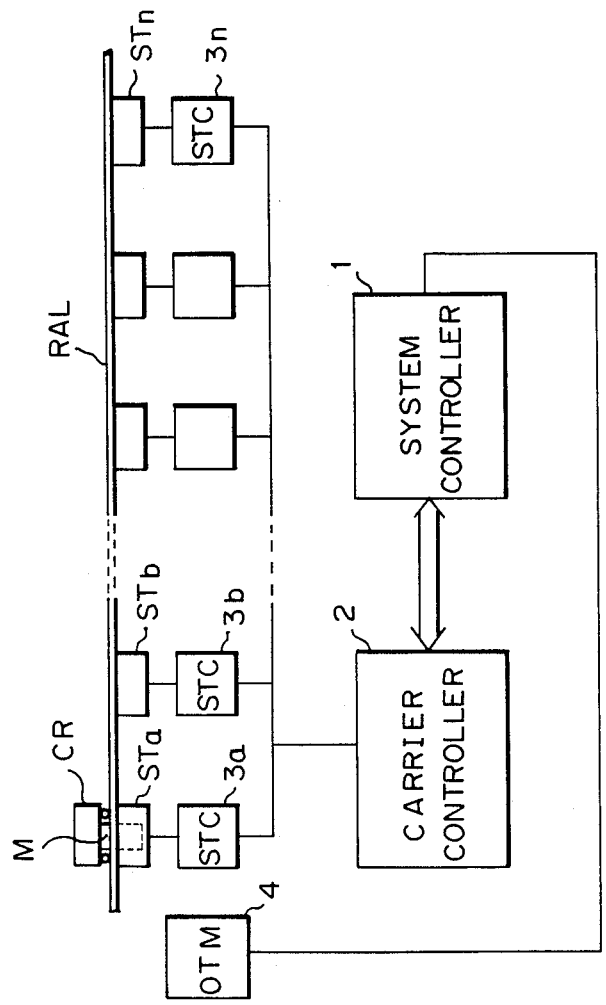
FIG. 1 is a diagram of an outline of a conventional linear motor car system.

FIG. 1 is a diagram illustrating the outline of a conventional linear motor car system, in which RAL represents a conveyance path (rail) and CR designates a conveyor for conveying an article (herein referred to as a "carrier"). A moving element (secondary conductor) M is attached to the carrier. Stations Sta, STb, ... include stator blocks and are arranged at appropriate intervals along the conveyance path RAL. Station controllers (STC) 3a, 3b, ... receive control commands from a carrier controller 2 and excite and control the stators to effect starting, acceleration, deceleration, and stopping of the carrier CR, and also effect loading and unloading of articles in the carrier. A conveyance command indicating the starting and stopping stations of the carrier is given to an on-line teller's machine (OTM) 4 by an operator. The conveyance command is applied to the carrier controller 2 through a system controller 1.

Figure 2:
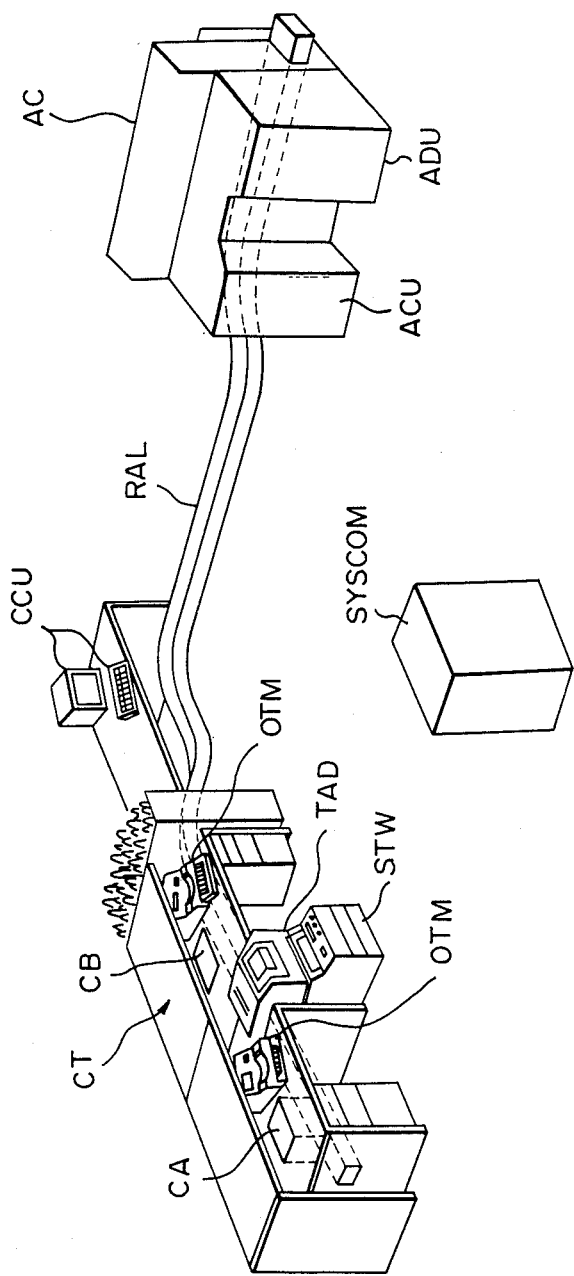
FIG. 2 is a diagram of an application example of the conventional linear motor car system.

FIG. 2 illustrates an example in which the linear motor car system is utilized for a cash delivery system in a bank. In this example, the conveyance path RAL is laid out between a window CT and a cashier machine AC, and stations (not shown) are arranged at cash loading and unloading portions and appropriate intermediate portions. Two operators (tellers) are working at the window CT. A cash throw-in and take-up opening CA or CB and on-line teller's machines OTM are arranged exclusively for each operator, and a teller's deposit machine TAD and a terminal writer STW are arranged commonly for the two operators. The cashier machine AC comprises a cash receiver ADU for receiving cash from a carrier and a cash dispenser ACU for supplying cash to the carrier. When a customer draws out cash, the carrier (not shown in FIG. 2) is delivered to the cash dispenser ACU of the cashier machine from the window CT, and the required amount of cash is loaded on the carrier. If the teller is on the side of the cash throw-in and take-up opening CA, the carrier is travelled to the opening CA and the teller opens the cover of the carrier at the opening CA, takes out cash from the interior of the carrier and hands it to the customer together with a bank receipt and the like. For a deposit, cash received from a customer is thrown into the teller's deposit machine TAD, the cash is counted and recorded in the terminal writer STW, and the cash is loaded on the carrier and fed to the cash receiver ADU while a bank receipt, etc., is returned to the customer.

In a bank having a certain number of teller's windows, a conveyance path is laid out to connect these windows. When these windows are arranged on first and second floors, a conveyance path connecting between the first and second floors becomes necessary.

Figure 3A:
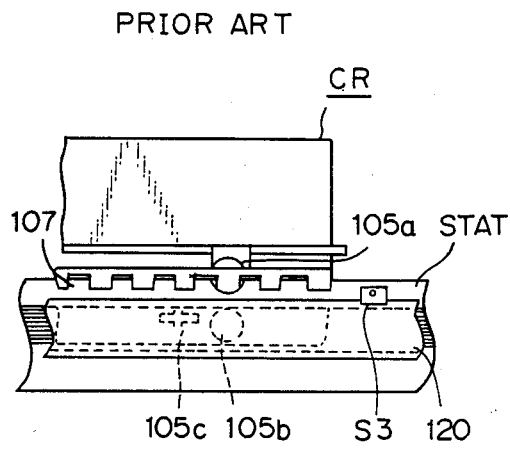
FIG. 3A is a side view of a station in the conventional linear motor car system.
Figure 3B:
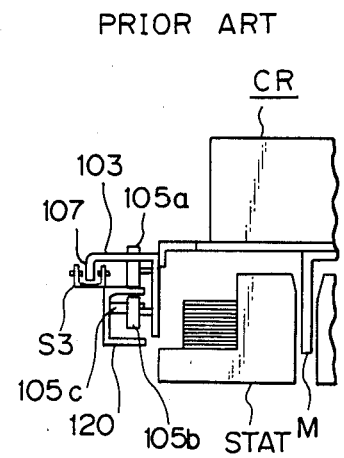
FIG. 3B is an another side view of the station.
Figure 3C:
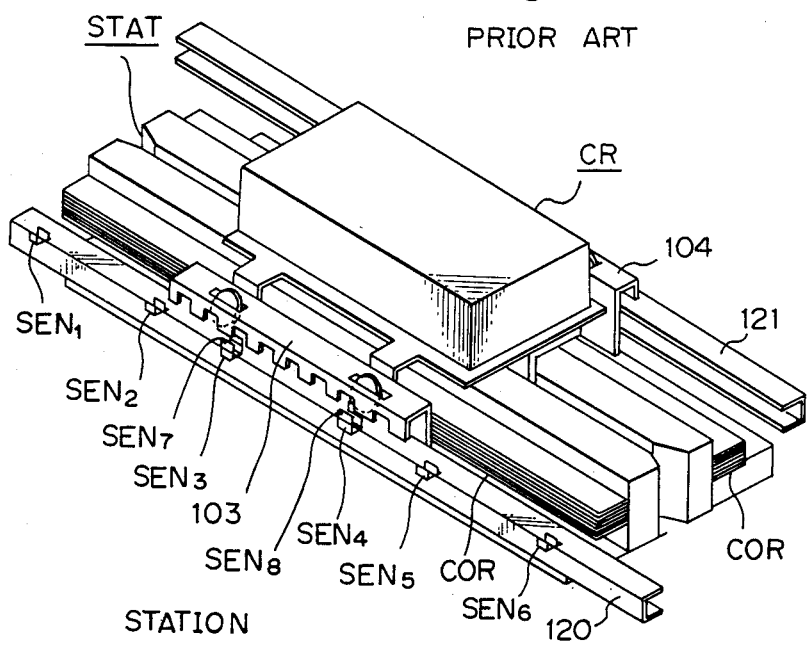
FIG. 3C is a perspective view of the station.

As shown in FIGS. 3A–3C, the conveyance path includes rails 120 and 121 having a shaped section, stators STAT arranged between these rails at appropriate intervals, and a cover (not shown) for covering the entire conveyance path. FIG. 3C illustrates a station area, and carrier-positioning and speed-detecting sensors SEN1 through SEN8 are attached to the rail 120. Rollers 105a and 105b are arranged to grip the upper side of the rail 120 from above and below the rail 120, and a roller 105c is arranged to press against the side of the rail 120. Similar upper and lower and lateral rollers are arranged on the side of the rail 121, and the carrier is thus guided in the vertical and horizontal directions. A plate 103 extending in the lateral direction is attached to the carrier, and a portion extending downward from this plate constitutes a notched portion 107 having a plurality of notches. Sensors SEN1 through SEN8 have light projectors and receivers opposing each other with the notched portion 107 intervening therebetween, so that the position and speed of the carrier are detected by an intermittent reception of light through the notched portion 107.

The stator STAT includes a pair of iron cores COR opposing each other with the moving element M (conductor plate corresponding to a rotor of a squirrel-cage induction motor) intervening therebetween, and a coil wound on the iron core.

Figure 3D:
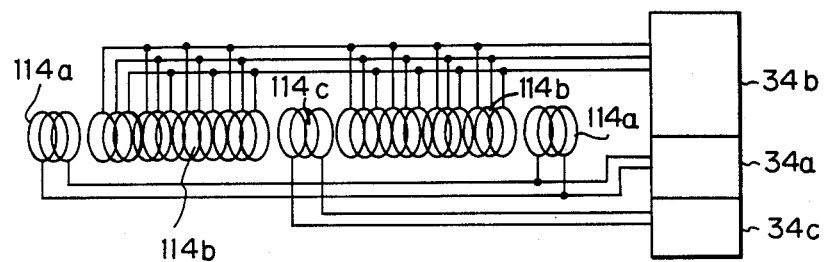
FIG. 3D is a diagram of a coil in a stator shown in FIGS. 3A–3C.

As shown in FIG. 3D, the coil comprises an acceleration and deceleration coil 114b, to which a 200 V three-phase alternating current is supplied to generate a moving magnetic field, a coil 114a, to which a single-phase alternating current is supplied to effect positioning of the carrier and a coil 114c, to which a direct current is supplied to brake the carrier. Drivers 34a through 34c are arranged to excite these coils.

Figure 4:
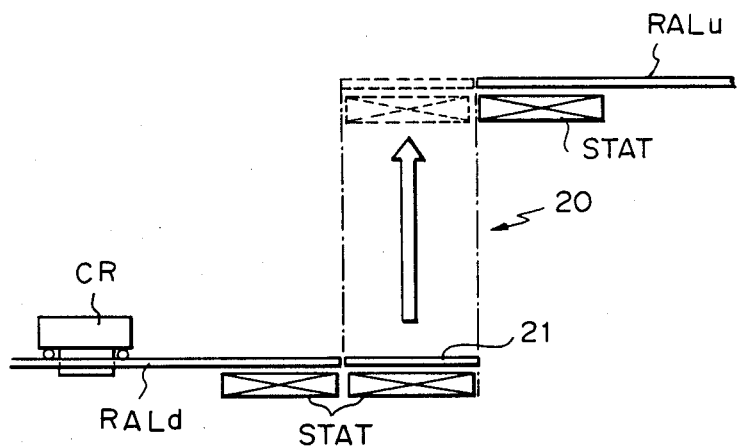
FIG. 4 is a diagram of an example of a conventional vertical conveyance means.

FIG. 4 shows a conventional linear motor car system using a rack-pinion system or a chain-belt system as a vertical moving means. In FIG. 4, the structure includes a lower conveyance path RALd (arranged, for example, on the first floor), an upper conveyance path RALu (arranged, for example, on the second floor) and a vertical conveyance zone 20 connecting these conveyance paths. The vertical conveyance zone 20 comprises a conveyance path (rail) portion 21 having a length sufficient to support a carrier CR and lift means (not shown) of a rack-pinion or chain-belt system for lifting or lowering the conveyance path portion 21. When the carrier CR which has advanced along the lower conveyance path RALd reaches and is placed on the conveyance path portion 21, the carrier is stopped and the lift means is actuated to raise the conveyance path portion 21. When the raised conveyance path portion 21 becomes aligned with the upper conveyance path RALu, the carrier is started and advanced along the upper conveyance path RALu.

The conventional system shown in FIG. 4, however, has problems in that the need for different driving means requires a complicated mechanical or electrical structure, with a resulting in loss of a long period of time needed for moving the carrier between the upper conveyance path RALu and the lower conveyance path RALd.

First Embodiment

Figure 5:
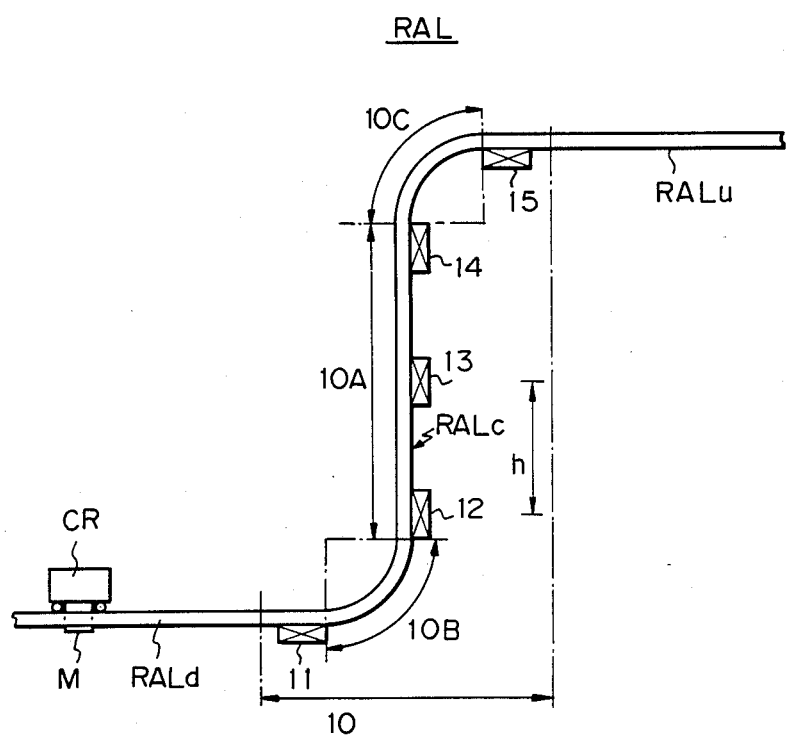
FIG. 5 is a diagram of a linear motor car system according to a first embodiment of the present invention.

FIG. 5 shows a first embodiment of the present invention. In FIG. 5, there is provided a conveyance path RAL of a linear motor car system, on which stators 11-15 of a linear motor car are arranged on the conveyance path RAL. A moving element (secondary conductor plate) M of the linear motor car is attached to a carrier CR. The carrier CR is placed on the conveyance path RAL. The stators 11-15 are excited to drive the carrier CR. The carrier moves by inertia between adjacent stators. The conveyance path RAL includes a lower horizontal conveyance path RALd, an upper horizontal conveyance path RALu, a vertical conveyance path 10A, a lower curved conveyance path 10B connected between the lower horizontal conveyance path RALd and the vertical conveyance path 10A, and an upper curved conveyance path 10C connected between the vertical conveyance path 10A and the upper horizontal conveyance path RALu. The stator 11 is arranged on the end portion of the lower horizontal conveyance path RALd, the end portion being connected to the lower curved conveyance path 10B. The stator 12 is arranged on the lower end portion of the vertical conveyance path 10A connected to the lower curved conveyance path 10B. The stator 14 is arranged on the upper end portion of the vertical conveyance path 10A connected to the upper curved conveyance path 10C. The stator 15 is arranged on the end portion of the upper horizontal conveyance path RALu connected to the upper curved conveyance path 10C. The other stators are dispersedly arranged on each of the conveyance paths RALd, 10A and RALu in accordance with necessity. It should be noted that a stator is not arranged on either of the curved conveyance paths 10B or 10C.

As shown in FIG. 5, in this first embodiment of the present invention, either the vertical zone or the horizontal zone has the same structure, in which stators are arranged in a conveyance path (rail), and a curved (arcuate) zone is formed in a connecting portion between a lower conveyance path RALd and an upper conveyance path RALu. The stators 11, 12 and 14, 15 are arranged on the inlet and outlet sides of the curved conveyance paths 10B and 10C, and if necessary, the stator 13 is arranged in the intermediate part of the vertical zone 10a. These stators 11 through 15 are the same as the above-mentioned stator STAT shown in FIGS. 3A–3C, and are provided with an acceleration and deceleration coil excited by a three-phase alternating current to generate a moving magnetic field, a positioning coil excited by a single-phase alternating current, and a braking coil excited by a direct current.

In this conveyance path, the carrier CR which has advanced along the lower conveyance path RALd is kicked by the stator 11 and is caused to move by inertia along the curved conveyance path 10B and arrives at the stator 12 on the outlet side of the lower curved conveyance path 10B. The carrier CR is here kicked to the intermediate stator 13, and the carrier CR is then again kicked to the stator 14 on the inlet side of the upper curved conveyance path 10C. The carrier CR is here kicked and caused to rise along the curved conveyance path 10C, and the carrier CR is kicked by the stator 15 on the outlet side of the curved conveyance path 10C and is moved along the upper conveyance path RALu. On the other hand, the carrier which has run along the upper conveyance path RALu is weakly kicked by the stator 15 and guided into the upper curved conveyance path 10C, the carrier is brought down along the curved conveyance path 10C by the force of gravity and is braked by the stators 14, 13 and 12 to prevent an excessive-speed running. Then, the carrier is delivered at an appropriate speed to the lower conveyance path RALd.

As is apparent from the foregoing description, in the conveyance path of the present invention, the carrier can be travelled in the horizontal and vertical zones by the same driving system of acceleration and deceleration by the stators and of moving between the stators, and therefore, the conveyance speed can be increased and the mechanical and electrical structures can be simplified. The driving force given to the moving element (secondary conductor) M by excitation of the stator is large, and stators arranged in the horizontal zone can be arranged in the vertical zone only by narrowing the distances. The distance h between adjacent stators in the vertical zone can be determined as follows:

$$\frac{1}{2} mv^2 = mgh \tag{1}$$

$$h = v^2/2g$$

wherein m represents the mass of the carrier and v represents the speed. Note, $mv^2/2$ represents the kinetic energy given to the carrier CR by the stator 12, and if the driving force of the stator is F and the length of acceleration is l, a relation of $mv^2/2 = F \cdot l$ is established. In this formula, it is supposed that the speed of the carrier, when it reaches the stator 12, is 0, and any friction is neglected. Accordingly, these factors should be taken into consideration in practice.

The stators in the vertical zone may be larger and stronger than the stators in the horizontal zone. However, from the viewpoint of mass production, it is preferred that the same stators be used in both the vertical zone and the horizontal zone.

The stator is not disposed in the curved zone. This is because, even if a stator STAT is arranged on the curved conveyance path as well as on the horizontal and vertical conveyance paths, a substantial increase of the driving force in the curved zone cannot be expected. That is, as compared with the positional relationship between the moving element M and stator STAT attached to the carrier CR in an ordinary linear conveyance path, which is shown in FIG. 7A, in the curved conveyance path shown in FIG. 6A, the stator STAT should be disposed at a position lower than the position of the mover M. Accordingly, flow of the eddy current, which is the source of the driving force, is very small, as shown in FIG. 6B, compared with the eddy current in the linear conveyance path shown in FIG. 7C. FIG. 6B shows the eddy current even in the best case when a stator is attached on the curved conveyance path. It will be seen from FIG. 6B that the lower return portion of the eddy current is reduced, and a driving force is not obtained.

This reduction of the eddy current and driving force by restriction of the lower end of the eddy current path may be prevented by imparting a sufficient length to the moving element M. However, in this case, the moving element is excessively long in the linear zone and the size of the cover of the conveyance path is inevitably increased.

Figure 6A:
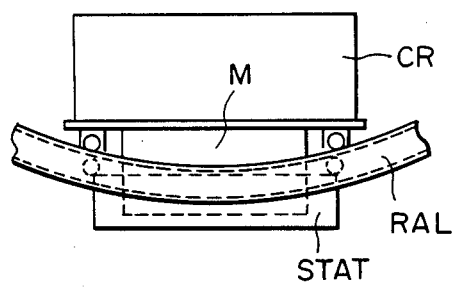
FIG. 6A is a diagram of a stator arranged on the curved conveyance path.
Figure 6B:
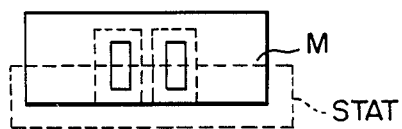
FIG. 6B is a diagram of an eddy current when a stator is attached to the curved conveyance path.
Figure 7A:
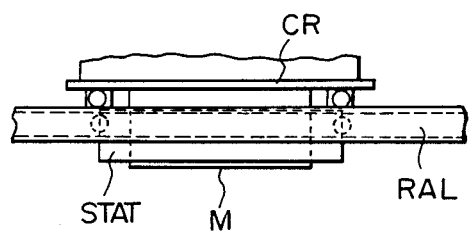
FIG. 7A is a diagram of a stator arranged on a linear conveyance path.
Figure 7B:
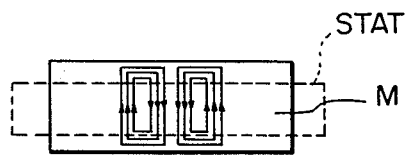
FIG. 7B is a diagram of an eddy current when a stator is attached to the linear conveyance path.

A convex curved conveyance path can be mentioned as well as the concave curved conveyance path as shown in FIG. 6A. However, in the case of the convex curved conveyance path, if a stator is disposed in this path, there is a risk of contact of the stator with the bottom face of the carrier. To eliminate this risk, the stator should be located at a position sufficiently lower than the position of the rail, which results in an increase of the size of the conveyance path as a whole. Moreover, in order to dispose the stator STAT in the curved zone, the positional relationship to the conveyance path should be taken into consideration, and this arrangement is difficult.

Even if in the curved zone a similarly curved stator STAT is disposed, this arrangement is disadvantageous in various points. For example, production of this curved stator is troublesome, and since this stator is different from the stators of the horizontal and vertical zones in the structure, mass production is difficult and the manufacturing cost is increased. Therefore, it is preferable that no stator be disposed in the curved zone. Since the linear motor has a sufficient power (driving force), if stators are arranged only on the inlet and outlet sides of the curved zone, the carrier is sufficiently delivered to the subsequent stator and running of the carrier can be sufficiently smoothly controlled.

As is apparent from the foregoing description, according to the first embodiment of the present invention, the carrier can be travelled similarly in both the vertical and horizontal zones, and the mechanism can be simplified and the travelling time shortened. Moreover, this can be accomplished by a low-cost and simple control. Furthermore, since a stator is not disposed in the curved zone but stators are arranged on the inlet and outlet sides of the curved zone, the production of the stators is simplified and the problem of reduction of the driving force during travel through the curved zone does not arise, and thus the carrier can be smoothly travelled at an appropriate speed.

Second Embodiment

The second embodiment of the present invention relates to a drive control in a linear motor car system.

Referring back to FIG. 1, where the carrier is moved from the station STa to the station STb, according to instructions from the system controller 1 through the carrier controller 2, electric power is supplied so that a predetermined control mode (acceleration control mode, deceleration control mode or stopping control mode) is attained in the stators arranged on the conveyance path RAL in the region of from the station STa to the station STb. Then, if a start command is given to the station STa, by the electromagnetic action given from the stator in the above-mentioned control mode, the carrier CR is moved from the station STa to the station STb.

Figure 8:
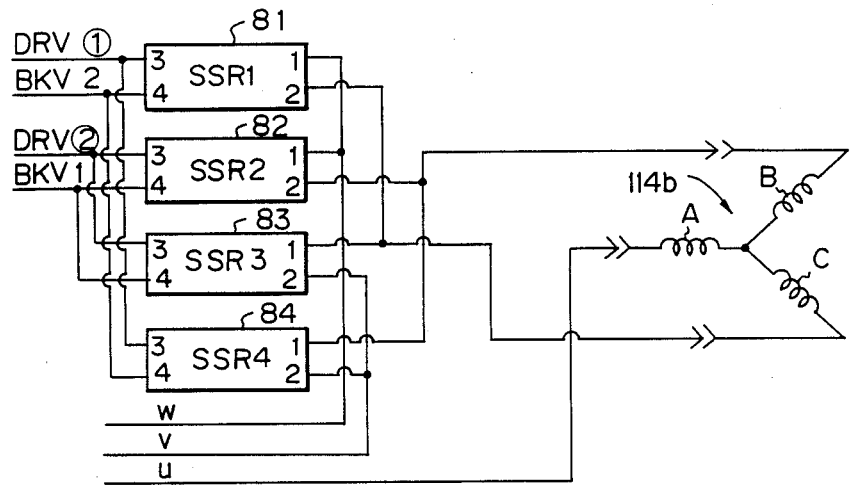
FIG. 8 is a diagram of a conventional system for supplying an electric current to the primary coil in the stator, for explaining a prior art of a second embodiment of the present invention.

The exciting mechanism for controlling the advance direction of the carrier CR will now be described. FIG. 8 shows a conventional system for supplying an electric current to the primary coil 114b (see FIG. 3D) constituting each stator. The primary coil comprises coils A, B and C. A u-phase current is always applied to the coil A from an alternating current power source, and one of v-phase and w-phase waves is applied in a changeover manner to the coils B and C through four semiconductor relays (SSR) 81 through 84. Namely, the semiconductor relays 81 through 84 change over the phase of the current supplied to the coils B and C based on a direction control signal from the carrier controller 2 and if a control signal in an excitation direction 1 (DRV 1 in the drawings) is given from the carrier con 2, the v-phase wave of a three-phase alternating current is supplied to the coil B through the semiconductor relay 84. At this point, the semiconductor relays 82 and 83 are kept in the current-cut state by a current-cutting control signal (BKV1 in the drawings) from the carrier controller 2. On the other hand, when a control signal is an excitation direction 2 (DRV 2 in the drawings) is given from the carrier controller 2, the v-phase wave of a three-phase alternating current is supplied to the coil C through the semiconductor relay 83 and the w-phase wave is supplied to the coil B through the semiconductor relay 82. At this point, the semiconductor relays 81 and 84 are kept in the current-cut state by a current-cutting control signal from the carrier controller 2 (BKV2 in the drawings). By changeover of the advance magnetic field by this changeover of the supply of the electric current, the carrier CR is accelerated or decelerated to an appropriate speed and is moved to the left or right on the horizontal conveyance path R.

As is apparent from FIG. 8, in the conventional article conveyance system, the control of acceleration and deceleration of the carrier is executed by changeover of the supply of an electric current to a primary coil constituting the stator. However, in case of a vertically changed zone, for example, a vertical conveyance path as described in the first embodiment or acutely inclined conveyance path connecting a first floor to a second floor or a first floor to a basement, since the downward driving force can be substituted by the gravity, acceleration and deceleration control can be performed only by generating an upward driving force. Accordingly, if the conventional acceleration and deceleration control mechanism is directly applied to a vertical conveyance zone, the number of parts is increased and the control becomes complicated.

It is therefore an object of the second embodiment of the present invention to simplify the acceleration and deceleration control of the carrier in a vertically changed zone of the conveyance path.

In order to attain the above object and eliminate the disadvantage of the conventional technique, according to the second embodiment of the present invention, in an article conveyance system comprising a conveyance path including a vertical conveyance zone, a carrier moved on the conveyance path by a linear motor as a drive source to convey an article and a controller for controlling the driving of the linear motor, in the vertical conveyance zone of the conveyance path, the controller generates a driving force for the linear motor only in the upward direction.

Figure 9:
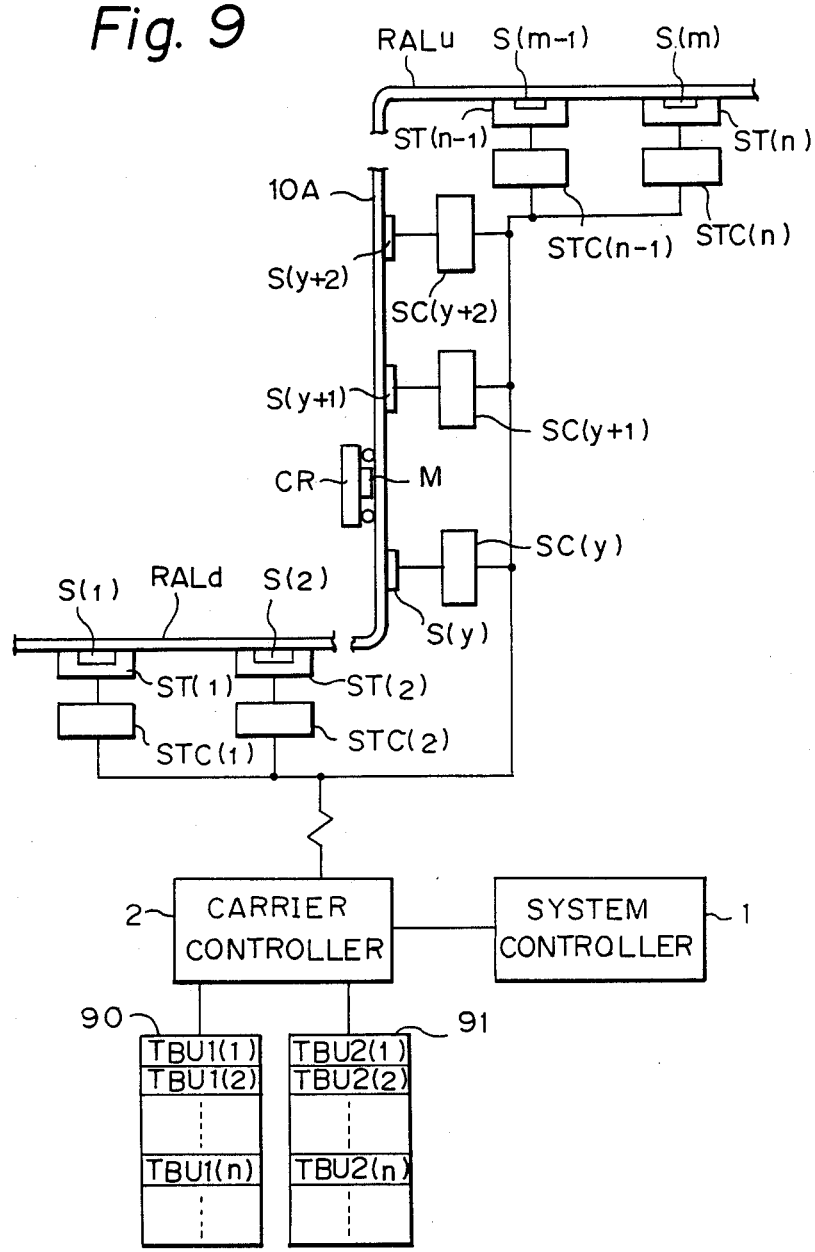
FIG. 9 is a diagram of an example of a detailed entire structure of the linear motor car system shown in FIG. 5, for explaining the second embodiment of the present invention.

The second embodiment of the present invention will now be described in detail with reference to FIGS. 9 and 10. FIG. 9 is a diagram illustrating an example of the detailed entire structure of the linear motor car system shown in FIG. 5. In FIG. 9, RAL represents a conveyance path laid out in a building such as a bank. Stations ST(1), ST(2), . . . ST(n-1) and ST(n) are arranged along this conveyance path RAL except for a vertical zone. In the vertical zone of the conveyance path RAL and at the positions of the respective stations, stators S(1) through S(m) including a primary coil as one constituent of a linear motor are arranged. Reference CR represents a carrier for conveying an article, and the secondary conductor plate M as another constituent of the linear motor is attached to this carrier R. By the electromagnetic action given to the secondary conductor plate M from the stators S(1) through S(m) arranged in the conveyance path RAL, the carrier R is caused to travel on the conveyance path RAL. Station controllers STC(1) through STC(n) for controlling the stators are arranged in correspondence to the respective stations ST(1) through ST(n). In the vertical zone, stator controllers SC(y), SC(y+1) and SC(y+2) are arranged to control stators S(y), S(y+1) and S(y+2). These station controllers STC(1) through STC(n) and stator controllers SC(y) through SC(y+2) are controlled in parallel by the carrier controller 2. A system controller 2 controls the entire system by giving commands of moving and stopping the carrier CR to the carrier controller 2.

Tables 90 and 91 are connected to the carrier controller 2. The tables 90 and 91 are used in the third embodiment which will be described later.

Figure 10:
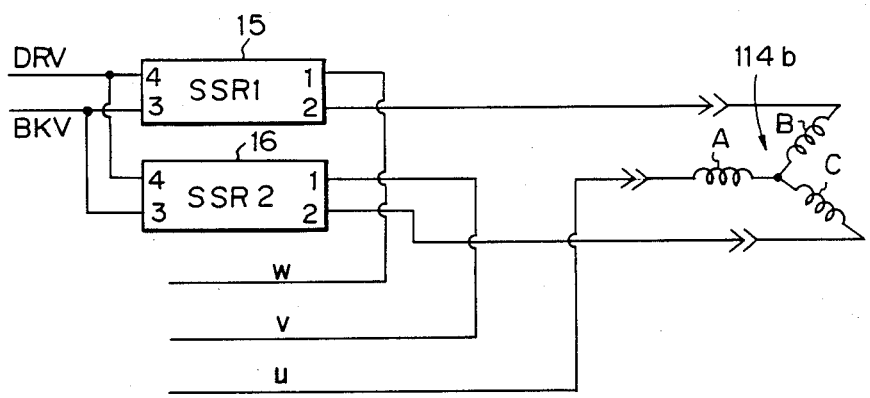
FIG. 10 is a diagram of a driving system for supplying an electric current to the primary coil in the stator, according to the second embodiment of the present invention.

According to the second embodiment of the present invention, the stators S(y) through S(y+2) arranged in the vertical zone of the conveyance path RAL are excited and driven as shown in FIG. 10. Referring to FIG. 10, the primary coil 114a comprises coils A, B and C, and semiconductor relays 15 and 16 are arranged to control the supply of an electric power. The semiconductor relays 15 and 16 supply an electric power to the primary coil 114b based on a control signal from the carrier controller 2. More specifically, when a drive signal (DRV in the drawings) is given to the semiconductor relays 15 and 16 from the carrier controller 2, a w-phase current is supplied to the coil B through the semiconductor relay 15 from an alternating current power source and a v-phase current is supplied to the coil C through the semiconductor relay 16. Note, the v-phase current is always supplied to the coil A. Accordingly, by thus supplying an electric current to the primary coil 114b, the linear motor comprising the stators S(y) through S(y+2) and the secondary conductor plate M drives the carrier R only in the upward direction. When a current-cutting signal (BKV in the drawings) is given to the semiconductor relays 15 and 16 from the carrier controller 2, the semiconductor relays 15 and 16 cut the supply of the electric current to the primary coil 114b.

The driving modes in the second embodiment are as follows.

In order to accelerate the upwardly moving carrier CR along the vertical conveyance path 10A, it is sufficient to transmit an upward-direction driving signal DRV from the carrier controller 2 to the input terminals 4 of the semiconductor relays 15 and 16 so that the w phase of the electric power is supplied through the terminals 1 and 2 of the relay it to the coil B, and the v phase of the electric power is supplied through the terminals 1 and 2 of the relay 16 to the coil C.

In order to decelerate the ascending carrier CR or to accelerate the descending carrier CR, it is sufficient to cut the electric power to the primary coil 114b by supplying the current cutting signal BKV from the carrier controller 2 to the terminals 3 of the semiconductor relays 15 and 16 so that the terminals 1 and 2 are disconnected.

In order to decelerate the descending carrier R, it is sufficient to supply the upward-direction control signal to the semiconductor relays 15 and 16 in the same way as mentioned before, so as to generate an upward driving force. In this case, the downward-direction force is the force of gravity minus the upward-direction force. Therefore, the carrier descends gradually along the vertical conveyance path.

Note, the acceleration and deceleration control of the carrier in the horizontal zone of the conveyance path is the same as in the conventional system.

According to the second embodiment of the present invention, in the vertically changed zone of the conveyance path, the acceleration and deceleration control of the carrier can be accomplished merely by generating a driving force only in the upward direction in the linear motor. Accordingly, the number of control parts (for example, semiconductor relays) for the stators to be arranged in the vertically changed zone of the conveyance path can be reduced and the control per se can be simplified, and therefore, the reliability of the control system in the vertically changed zone can be improved.

Third Embodiment

The third embodiment of the present invention relates to a linear motor car control system when the carrier fails to rise along the vertical conveyance path.

Referring back to FIG. 9, the stators S(y), S(y+1), . . . are arranged along the vertical conveyance path so that the carrier is accelerated upward an the carrier is vertically moved upward. In this case, the carrier intrudes into the first stator arranged in the vertical zone at a predetermined speed and is accelerated by this stator, and the carrier is caused to rise against the force of gravity and arrives at the second stator at a predetermined speed. The carrier is similarly accelerated and passes through the vertical conveyance path while repeating the above procedures. The carrier controller 2 sequentially controls the stators S(y), S(y+1), . . . in accordance with the movement of the carrier. After the passage of the carrier through a station, the stator is de-energized.

In the linear motor car system, however, where a loaded article is too heavy to obtain a sufficient speed, or where a certain problem inhibiting ascending of the carrier takes place, for example, an unpassed stator breaks down, the carrier will not completely ascend the vertical zone conveyance path. Since the passed stators are de-energized by the controller, the carrier will descend unchecked along vertical conveyance path, and the carrier itself can be broken or the conveyance path is damaged by violent running of the carrier in free fall.

Accordingly, the third embodiment of the present invention is directed to prevent the free fall the carrier when the carrier fails to completely ascend the vertical conveyance path.

In accordance with the third embodiment of the present invention, when the carrier controller judges that the carrier ascending the vertical conveyance path will not be able to complete its ascent, the carrier is caused to gradually descend.

Figure 11:
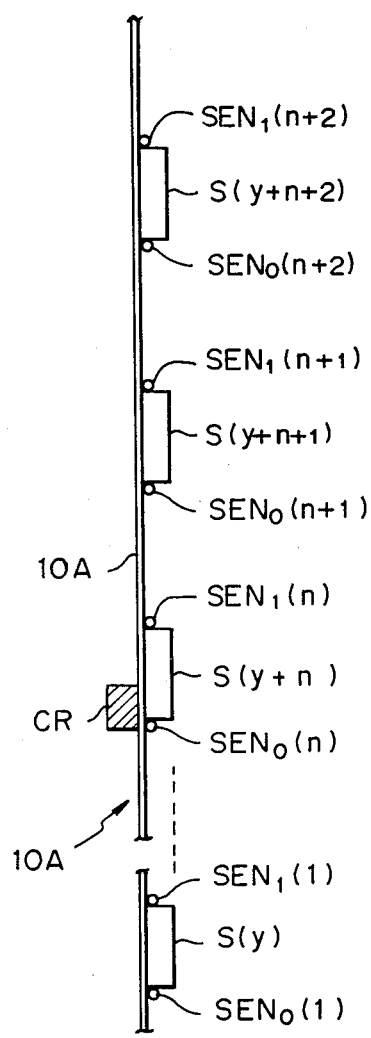
FIG. 11 is a diagram of an example of a vertical conveyance path along which sensors for detecting an intrusion and passage of a carrier are provided, for explaining the third embodiment of the present invention.

As shown in FIG. 11, judgment of the whether or not the carrier CR will be able to complete its ascension of the vertical conveyance path 10A is made by photoelectric sensors $SEN_0(1)$ through $SEN_0(n+2)$ and $SEN_1(1)$ through $SEN_1(n+2)$ attached to the ends of the respective stators $S(y)$ through $S(y+n+2)$ arranged along the vertical conveyance path 10A.

The description will now be made with reference to the stator $S(y+n)$ as an example. Sensors $SEN_0(n)$ and $SEN_1(n)$ are arranged below and above ends of the stator $S(y+n)$. The sensor $SEN_0(n)$ acts as the sensor for detecting intrusion of the carrier when the carrier CR ascends and as the sensor for confirming the passage of the carrier when the carrier CR fails in its attempt.

Figure 12:
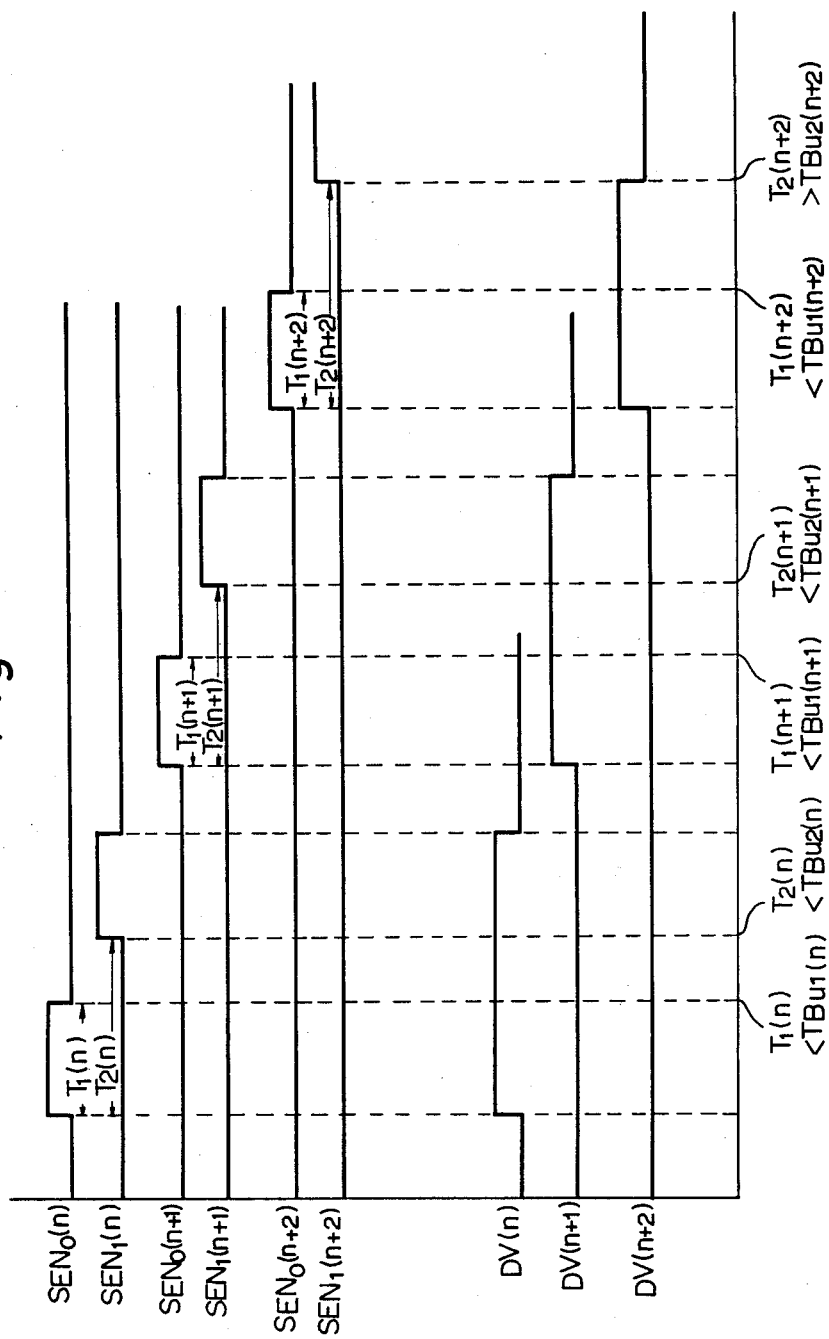
FIG. 12 is a timing chart of the exciting method of the drivers according to the third embodiment of the present invention.

FIG. 12 is a timing chart during the ascent of the carrier CR. Control of the ascension of the carrier CR will now be described with reference to FIG. 11 and FIG. 12. When the sensor $SEN_0(n)$ for detecting intrusion of the carrier is turned ON, the carrier controller 2 (see FIG. 9) judges intrusion of the carrier CR onto the stator $S(y+n)$ to turn on a driver $DV(n)$ (not shown) for exciting the stator $V(n)$, whereby the stator $V(n)$ is excited and the carrier CR is accelerated. The driver $DV(n)$ is in the corresponding stator controller $S(y+n)$ (see FIG. 9).

By subsequent ascension of the carrier CR, the sensor $SEN_0(n)$ is turned OFF. The time from the point of turning-ON of the sensor $SEN_0(n)$ to the point of turning-OFF of the sensor $SEN_0(n)$ is represented by $T1(n)$ in FIG. 12. Then, the sensor $SEN_1(n)$ is turned ON, and the time from the point of turning-ON of the sensor $SEN_0(n)$ to the point of turning-ON of the sensor $SEN_1(n)$ is represented by $T2(n)$. These variables $T1(n)$ and $T2(n)$ are compared with predetermined constant Tables $TBU1(n)$ and $TBU2(n)$ (see FIG. 9), and the time of excitation of the driver $DV(n)$ is determined based on the results of the comparison. Namely, the driving period of the driver $DV(n)$ is a function of the times $T1(n)$ and $T2(n)$, and the threshold values are given by the constant tables $TBU1(n)$ and $TBU2(n)$. Note, the time $T1(n)$ represents a value corresponding to the speed at which the carrier CR intrudes into the stator $S(y+n)$, and the time $T2(n)$ represents a value corresponding to the degree of acceleration of the carrier given by the stator $S(y+n)$. The judgement of whether or not ascension of the carrier is possible is accomplished in the carrier controller 2 by checking the time-over based on the comparison of the times $T1(n)$ and $T2(n)$ with the constant tables $TBU(1)$ and $TBU(2)$. Namely, where ascension of the carrier CR is impossible two cases are included; that is, the case where the time $T1(n)$ is larger than $TBU(n)$, that is, the case where the carrier CR does not arrive at the stator $S(y+n)$ at a sufficient speed; and the case where the time $T2(n)$ is larger than $TBU2(2)$, that is, the case where the carrier is not sufficiently accelerated by the stator $S(y+n)$. In such a time-over case, the carrier controller 2 stops ascending control of the carrier CR and immediately performs descending control. Exciting times of the respective stators in descending control are determined by comparing the times required for turning-ON and turning-OFF of the sensors $SEN_1(n)$ and $SEN_0(n)$ with predetermined constant tables, as in the exciting method in rising control. In the vertical conveyance path, the respective stators excite the carrier CR upward so as to brake free falling of the carrier and gradually drop the carrier CR to the lower end of the vertical zone. In FIG. 12, the line $T2(n+2)$ is larger than the constant table $TBU2(n+2)$. Therefore, the excitation of the driver $DV(n+2)$ is stopped at the judgement of $T2(n+2) > TBU2(n+2)$. After this judgement, the control of the gradual descent is effected.

Figure 13:
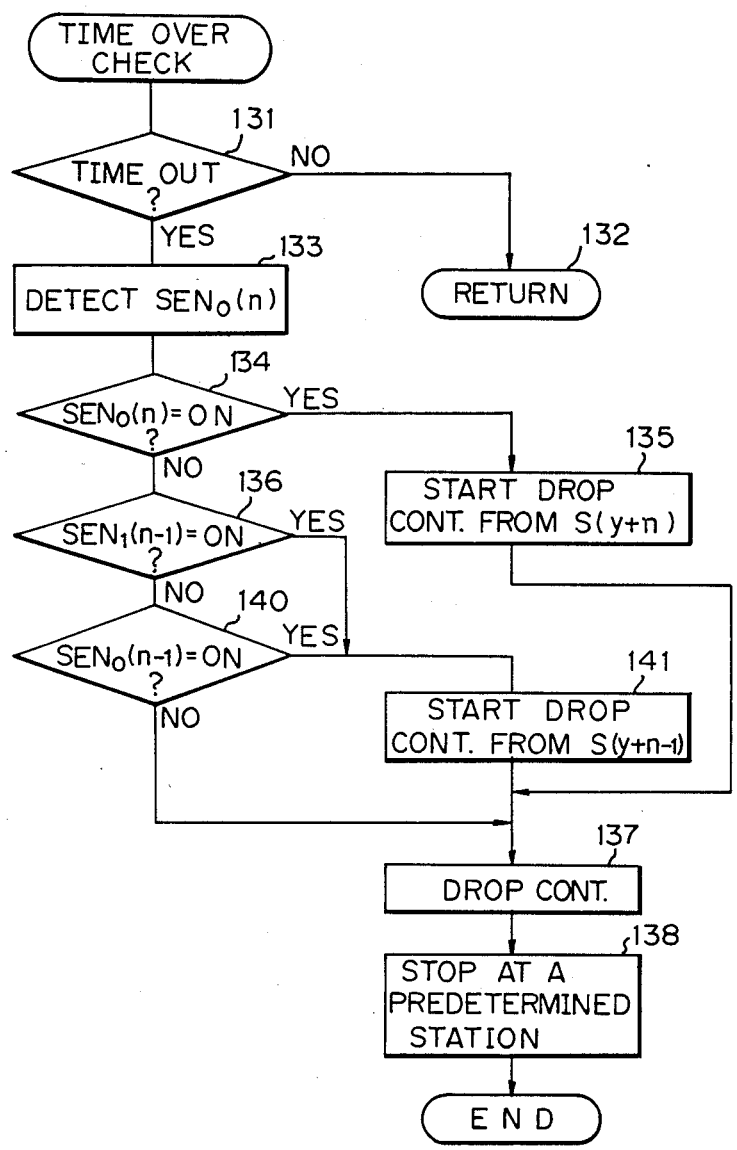
FIG. 13 is a flow chart of a gradual drop control, according to the third embodiment of the present invention.

FIG. 13 is a flow chart of the gradual drop control. In FIG. 13, when the carrier controller 2 detects a time-over at the step 131, in order to know the presence position of the carrier CR, turning-ON or turning-OFF of the sensors $SEN_0(n)$, $SEN_1(n-1)$, $SEN_0(n-1)$, ... are checked at the steps 131, 134, 136 and 140 in the order of the probability of the presence of the carrier. The carrier CR is assumed to be present at the sensor where turning-ON is detected, and the descent control processing is sequentially performed from said sensor. That is, when the sensor $SEN_0(n)$ is ON at the step 133, the process goes to the step 135 to that the dropping control is started from the stator $S(y+n)$ at which the sensor $SEN_0(n)$ is attached whereas, when the sensor $SEN_1(n-1)$ is ON at the step 136, or when the sensor $SEN_0(n-1)$ is ON at the step 140, the process goes to the step 141 so that the descent control is started from the stator $S(y+n-1)$ at which the sensors $SEN_1(n-1)$ and $SEN_0(n-1)$ are attached. After the descent control process is started at step 137, the carrier CR is driven upward again, and at this time, in order to clarify the stopping position of the carrier CR, the carrier controller 2 makes a control such at step 138 that the carrier CR will be stopped at the position of the predetermined station with non-contact stop.

According to the third embodiment of the present invention, when it is judged that a carrier ascending along the vertical conveyance path will not be able to complete it ascension through the vertical conveyance path, the carrier is controlled to gradually descend. Accordingly, occurrence of such troubles as breakage of the carrier and damage of the conveyance path by free falling of the carrier can be prevented.

Fourth Embodiment

The fourth embodiment of the present invention relates to a linear motor car control system for preventing breakage of the carrier by falling when the carrier erroneously intrudes from the upper horizontal conveyance path into the vertical conveyance path.

Referring back to FIG. 3C, each station is provided with light transmission type photoelectric sensors SEN1 through SEN8. Of these sensors, the sensors SEN1 through SEN6 are arranged along the front-back direction of the stator STAT to detect the notched portion 107 formed in the carrier CR and detect the speed of the carrier CR. The other two sensors SEN7 and SEN8 are arranged above the two sensors SEN3 and SEN4, so that it is possible to detect whether or not the carrier CR is present in the station ST. Thus, each station ST for controlling travelling of the carrier CR confirms whether or not the carrier CR is present in the station ST and measures the speed of the carrier CR.

If an article is to be conveyed vertically, for example, between different floors of a building, in the conveyance path RAL, the vertical conveyance path 10A is formed between the lower horizontal conveyance path RALd and the upper horizontal conveyance path RALu, as described before in the first embodiment (see FIG. 5). In the conveyance path R, a vertical zone R2 is formed between a horizontal zone R1 and a horizontal zone R3, and the carrier should be passed through this vertical zone.

In this case, stators $S(y), \ldots, S(y+n), S(y+n+1), S(y+n+2)$, are arranged in the vertical conveyance path 10A as in the stations $ST(1), ST(2), \ldots,$ and $ST(n)$ of the horizontal conveyance paths RALd and RALd, so that the carrier CR is accelerated upward to move in the vertical direction as already described with reference to FIG. 5 or 9. Where the carrier CR is moved downward, if the carrier CR is allowed to freely fall by the force of gravity, since the speed of the carrier is too high, the carrier CR or the conveyance path PAL is broken or an article loaded on the carrier CR is scattered. Accordingly, in this case, the carrier controller 2 excites the stators arranged in the vertical zone to give an upward direction force to the carrier CR and brake the carrier C so that the speed of the carrier C does not exceed a predetermined level.

In this linear motor car control system, where carrier CR intrudes into the vertical conveyance path 10A in the controlled state, the speed does not exceed the predetermined level and passes through the path 10A normally. If, however, the carrier CR intrudes into the vertical path 10A in the uncontrolled state by violent running or the like, the carrier CR is not braked by the stators but is allowed to freely fall, resulting in breakage of the carrier CR or the conveyance path RAL or dropping of a loaded article.

According to the fourth embodiment of the present invention, in order to solve the above-mentioned problem and prevent breakage of the carrier or the like while controlling the speed of the carrier CR below a predetermined level, when the carrier erroneously intrudes in the vertical conveyance path from the upper horizontal conveyance path, the stators arranged along the vertical conveyance path are excited to brake the carrier.

Figure 14:
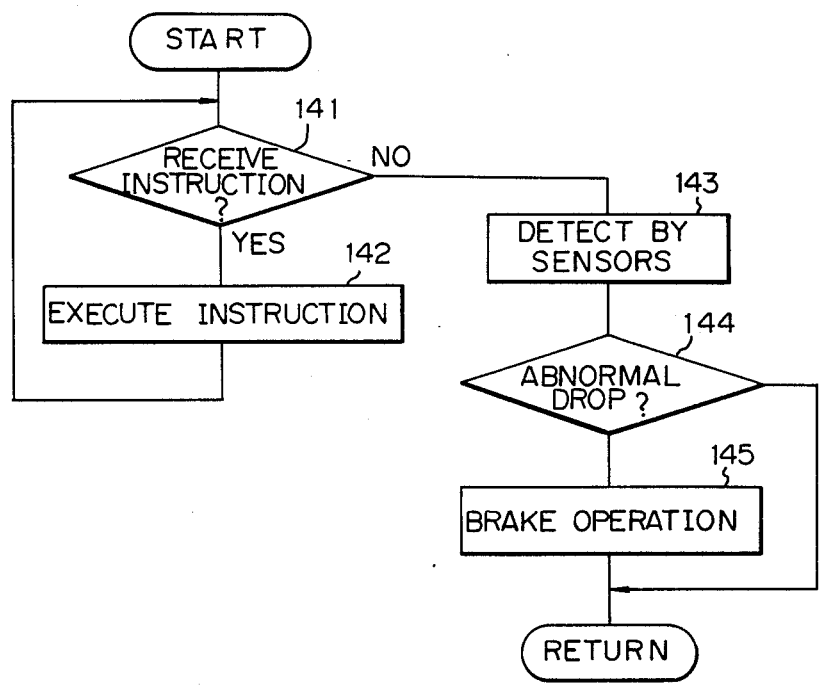
FIG. 14 is a flow chart explaining the brake operation in an abnormal drop of a carrier, according to the fourth embodiment of the present invention.

FIG. 14 is a flow chart explaining the fourth embodiment of the present invention.

Referring to FIGS. 9 and 14, at step 141, the controller 2 discriminates whether or not the carrier CR located on the upper horizontal conveyance path has received a command for descending through the vertical conveyance path 10A. If the carrier CR has received this command, the command is executed at stop 142 so that the carrier CR is caused to descend through the vertical conveyance path 10A in the braked state. If the carrier CR has not received the descending command, then, at step 143, the sensors $SEN_1(n+2)$ and $SEN_0(n+2)$ attached to the stators $S(y+n+2)$ arranged on the vertical conveyance path 10A detect the position and the speed of the carrier CR by detecting the number of pulses, and it is judged, at the step 144, whether or not the descent is normal. If it is judged that the falling is abnormal, the stators $S(y+n+2), S(y+n+1), S(y+n), \ldots,$ and $S(y)$ are sequentially excited to give an upward force to the carrier CR so as to brake the carrier CR and prevent the speed of the carrier CR from exceeding a predetermined level.

According to this fourth embodiment, even if the carrier CR erroneously intrudes into the vertical conveyance path 10A from the upper horizontal conveyance path RALu by violent running or the like, it is prevented from freely falling, and the carrier controller 2 excites the stators to brake the carrier CR and the speed of the carrier CR is maintained below the predetermined level. Therefore, even if such an accident takes place, breakage of the carrier CR or the conveyance path RAL or dropping of the loaded article can be prevented.

Fifth Embodiment

The fifth embodiment of the present invention relates to a linear motor car control system in which it is made easy for the carrier to pass through the vertical conveyance path when the carrier fails to ascend the vertical conveyance path and descends. According to the fifth embodiment, even in that case, the carrier controller 2 causes the carrier to again attempt to traverse the vertical conveyance path, but at a speed higher than the speed of the original attempt of traversing the vertical conveyance path, after the failed attempt.

Figure 15:
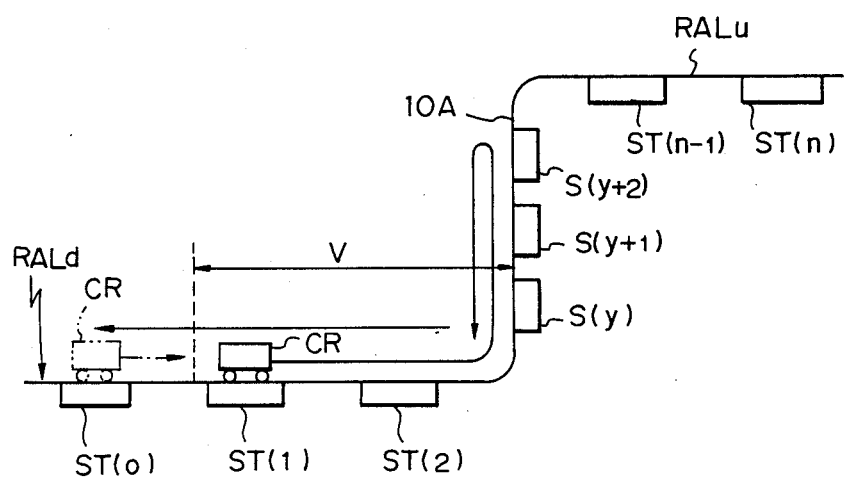
FIG. 15 is a simplified diagram of FIG. 9, for explaining the fifth embodiment of the present invention.

FIG. 15 is a simplified diagram of FIG. 9, for explaining the fifth embodiment of the present invention. As shown in FIG. 15, and as described before with reference to FIG. 9, along the vertical conveyance path 10A, the stators $S(y), S(y+1), S(y+2), \ldots$ are disposed as in the positions of the stations $ST(0), ST(1), \ldots$ of the horizontal conveyance paths RALu and RALd so that the carrier CR is accelerated upward and is moved upward. In this case, the carrier CR intrudes at a predetermined speed into the first stator $S(y)$ arranged along the vertical conveyance path 10A and is accelerated by this stator $S(y)$ and is allowed to ascend against the force of gravity. Thus, the carrier CR arrives at the second stator $S(y+1)$ at a predetermined speed and the carrier CR is similarly accelerated. By repeating these procedures, the carrier CR is passed through the vertical conveyance path 10A.

In this article conveyance system, if an article loaded on the carrier C is too heavy or the supply of power is cut, a reduction of the power source voltage or instantaneous braking is caused while the carrier CR travels along the vertical conveyance path 10A, the carrier CR fails to completely ascend the vertical conveyance path 10A and is caused to descend from a midway point.

In this case, the carrier CR which has descended is driven again by the stator $S(y)$ to pass through the vertical conveyance path 10A. However, if the carrier CR is caused to intrude into the vertical path 10A under the same conditions as in the preceding intrusion, there is a risk of another failure to rise and pass through the vertical zone R2.

According to the fifth embodiment of the present invention, in an article conveyance system comprising a conveyance path including a vertical conveyance zone, a carrier moved on the conveyance path by a linear motor as a drive source to convey an article and a controller for controlling travelling of the carrier, in order to solve the above-mentioned problem and increase the possibility of success in the ascent which is conducted after failure of the carrier to rise through the vertical conveyance path, when the carrier fails to ascend the vertical conveyance path and descends, the carrier controller causes the carrier to intrude into the vertical conveyance path at a speed higher than the speed of intrusion into the vertical conveyance path at the time of failure.

Since the speed of the carrier for intrusion into the vertical conveyance path after failure completely ascend the vertical conveyance path is higher than the intrusion speed at the time of failure, the ascending force of the carrier is increased and therefore, the possibility of success in passing through the vertical conveyance path is increased.

In more detail, where the carrier CR which starts from a predetermined station ST(2) on the lower horizontal conveyance path RALd and makes an upward movement fails to completely rise and pass through the vertical zone for some reason or other, and descends, the carrier CR stops at any station, for example, ST(2) on the lower horizontal conveyance path RALd. This is because the station ST(2) is controlled by the carrier controller 2 so that when the carrier CR passes through the station ST(2) where starting and acceleration or deceleration are effected and the carrier CR intrudes into this station ST(2) again, the stopping mode for stopping the carrier CR is produced.

Figure 16:
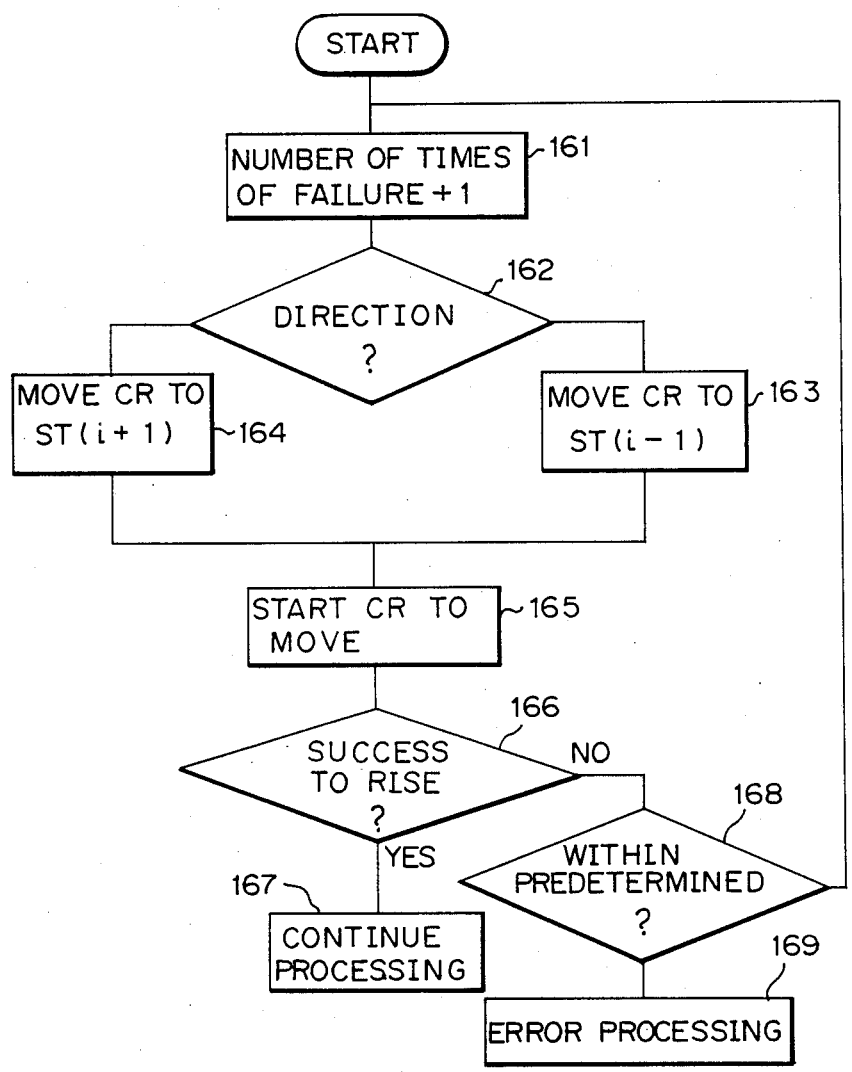
FIG. 16 is a flow chart explaining a higher intrusion speed given to the carrier after a failure to rise, according to the fifth embodiment of the present invention.

While the number of times of failure to successfully ascend is within a predetermined range, the descending carrier CR is withdrawn to the station ST(1) adjacent to the starting station ST(2) on the side opposite to the vertical conveyance path 10A, and the carrier CR is accelerated at this station ST(1) so that the carrier CR intrudes into the vertical conveyance path 10A at a speed higher than the intrusion speed at the time of failure. This operation will now be described with reference to a flow chart shown in FIG. 16. At first, it is confirmed that the carrier, which has failed to ascend, is descending and has stopped at the station ST(n), and, at step 161, the number of times of re-intrusion is counted. At every re-intrusion, "1" is added to a memory in which the initial value is "0", in order to move the carrier CR to the station ST(n-1) adjacent to the starting station ST(n) on the side of the vertical conveyance path 10A, at step 162, the direction of the increasing number of the stators ST(0), ST(1), ST(2), . . . on the lower horizontal conveyance path RALd is discriminated. When the number i of the stator ST(i) is increased toward the vertical conveyance path 10A, the step 163 is executed so that the carrier CR is moved to the adjacent station ST(i-1) which is remote from the vertical conveyance path 10A with respect to the station ST(i). By contrast, when the number i of the stator ST(i) is decreased toward the vertical conveyance path 10A, the step 164 is executed so that the carrier CR is moved to the adjacent station ST(i+1) which is remote from the vertical conveyance path 10A with respect to the station ST(i).

The stators S and stations ST for passage and stoppage are set at acceleration-deceleration and stopping modes, and after confirmation of the setting of the mode, the carrier CR is started to move at step 165. The carrier CR is then accelerated or decelerated at the respective stations ST and stator S and the carrier CR is thus caused to ascend along the vertical conveyance path 10A. At step 166, it is discriminated whether or not the carrier CR is successful in its ascent. If the carrier CR is successful in its ascent, the subsequent predetermined processing is carried out at the step 167. When the carrier CR fails to completely ascend again, it is discriminated at step 168 whether the number of times of failure is within a predetermined range. If the number is within the predetermined range, the above operation is repeated and the carrier CR is shifted back to the next starting position. If failure is repeated a predetermined number of times, the operation is terminated and treated as an error at step 169.

This embodiment is effective when failure of the carrier CR to rise is due to an insufficient speed of the carrier CR because of a malfunction of the stator, an excessive weight of an article loaded on the carrier CR or reduction of the voltage.

Sixth Embodiment

In this embodiment, the conveyance path, stators and carrier are the same as in the fifth embodiment. Accordingly, description of these members is omitted.

Figure 17:
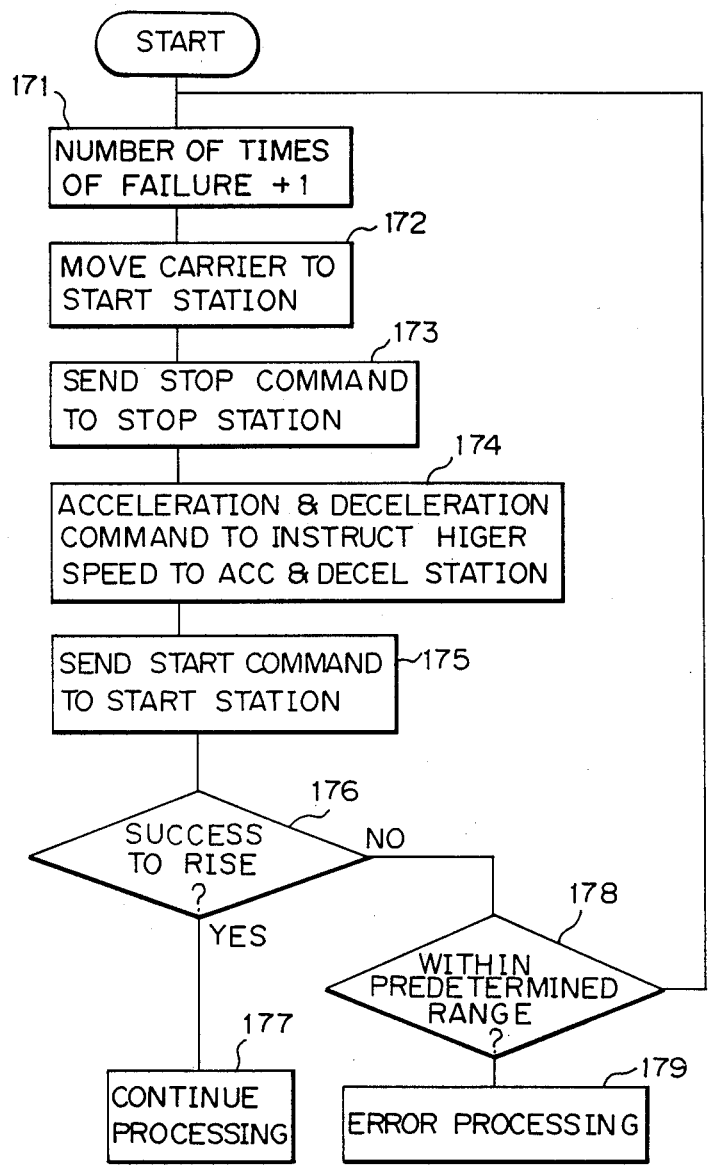
FIG. 17 is a flow chart explaining a higher intrusion speed given to the carrier after a failure to rise, according to the sixth embodiment of the present invention.

In the sixth embodiment, when the carrier CR fails to rise through the vertical conveyance path 10A, the carrier controller 2 performs a control such that the carrier CR is started again from the previous starting station ST and the speed of the carrier CR for intrusion into the vertical conveyance path 10A is made higher than the previous intrusion speed. The sixth embodiment will now be described with reference to a flow chart of FIG. 17. When the carrier CR fails to ascend the vertical conveyance path 10A, the carrier CR stops at any station ST at in the first embodiment. At this time, at step 171, the number of times of failure to ascend is counted. Then, at the step 172, the carrier CR is moved and stopped at the starting station ST from which the carrier, CR has started at the preceding ascent attempt. The carrier controller 2 sets the modes for the stations ST through which the carrier CR will pass. At this mode setting, at step 173, by sending a stop command to a stop station, the stopping mode is set for the station where the carrier CR will stop. Then, at step 174, the acceleration-deceleration mode is set for other stations ST and stators S as in the preceding mode setting, but the acceleration-deceleration mode is set so that a speed higher than the speed of the carrier CR at the preceding rising is given to the carrier CR. After it is confirmed that the acceleration-deceleration and stopping modes have been set for the stators S and stations ST for passage and stoppage, the carrier CR is started at step 175 by sending a start command to the start station, and is accelerated or decelerated at the respective stations ST and stators S to ascend the vertical conveyance path 10A. Then, at step 176, it is discriminated whether or not the carrier CR is successful in its ascent attempt. If the carrier CR is successful in ascending the vertical conveyance path 10A the subsequent predetermined processing is carried out at step 177. At the time of failure, if the number of times of failure is within a predetermined range at step 178, the above procedures are repeated to increase the speed of the carrier CR. When the carrier CR fails to rise a predetermined number of times, the operation is terminated and treated as an error.

Accordingly, the sixth embodiment is especially effective when the kinetic friction coefficient at the time of passage of the carrier through the curved conveyance path 10B (see FIG. 5) is large.

According to the fifth and sixth embodiments of the present invention, when the carrier fails to successfully ascend the vertical conveyance path, the carrier is started again at a speed higher than the speed of the carrier at the time of failure, and therefore, the possibility of success of the carrier in ascending the vertical conveyance path is increased and the operation efficiency of the linear motor car system can be increased.

Seventh Embodiment

In the foregoing embodiments, if the carrier starts its approach run from a station relatively close to the vertical zone and intrudes into the vertical zone, the speed is insufficient and the carrier fails to ascend against the force of gravity. Accordingly, the carrier cannot climb over the vertical zone but descends from the midway point.

Therefore, the problem to be solved by the seventh embodiment is how to ensure that the carrier will climb.

In order to solve the above problem, according to the seventh embodiment of the present invention, as shown as a summary in FIG. 18, in controlling the ascending movement of the carrier, when, at step 181, the starting position of the carrier is within a predetermined approach section V, the carrier is withdrawn to a position where at least a predetermined minimum approach distance can be obtained.

Figure 19:
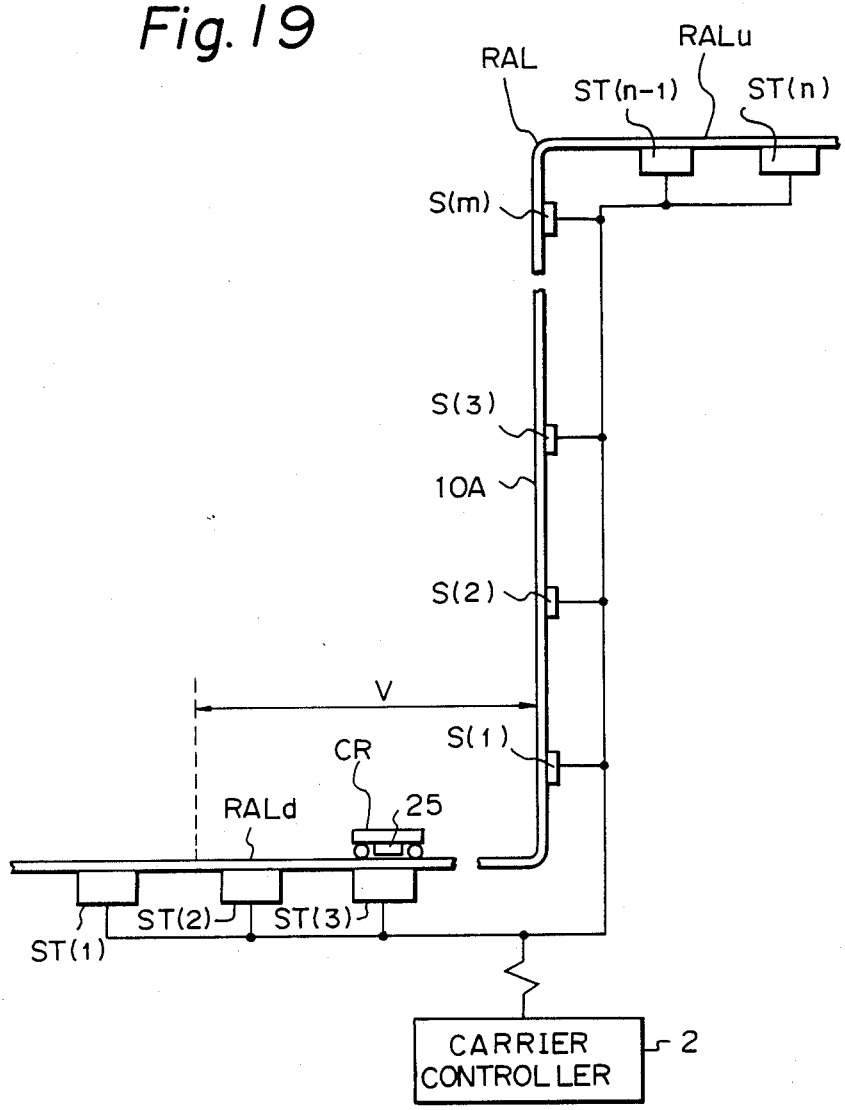
FIG. 19 is a simplified diagram of FIG. 9, illustrating a linear motor car system for explaining the seventh embodiment of the present invention.

FIG. 19 is a diagram illustrating a linear motor car system for explaining the seventh embodiment of the present invention. FIG. 19 is very similar to FIGS. 5, 9, and 15.

In FIG. 19, stators S(1) through S(m) constituting a linear motor are arranged along the vertical conveyance path 10A, and a plurality of stations ST(1) through ST(n) having stators (not shown in FIG. 19) are arranged along the horizontal conveyance paths RALd and RALu. By controlling the stators to modes of starting, acceleration, deceleration and stopping by a carrier controller 2, a secondary conductor plate 25 disposed on the carrier CR is driven, whereby the carrier CR is moved, for example, from the station ST(1) to the station ST(n). A minimum approach distance necessary for the carrier CR to climb the vertical conveyance path 10A is a section indicated by V. When the carrier CR starts from the station ST(3) and ascends, if the carrier CR is caused to intrude into the vertical conveyance path 10A in this state, the speed is insufficient and the carrier CR fails to successfully ascend. According to the seventh embodiment of the present embodiment, the carrier controller 2 judges whether or not the starting position of the carrier CR is within the predetermined section V, and when the carrier CR is within the section V, the carrier CR is once retreated to the station (the station ST(1) in the present embodiment in FIG. 19) outside the section V and then, the ascending conveyance treatment is carried out.

Figure 20:
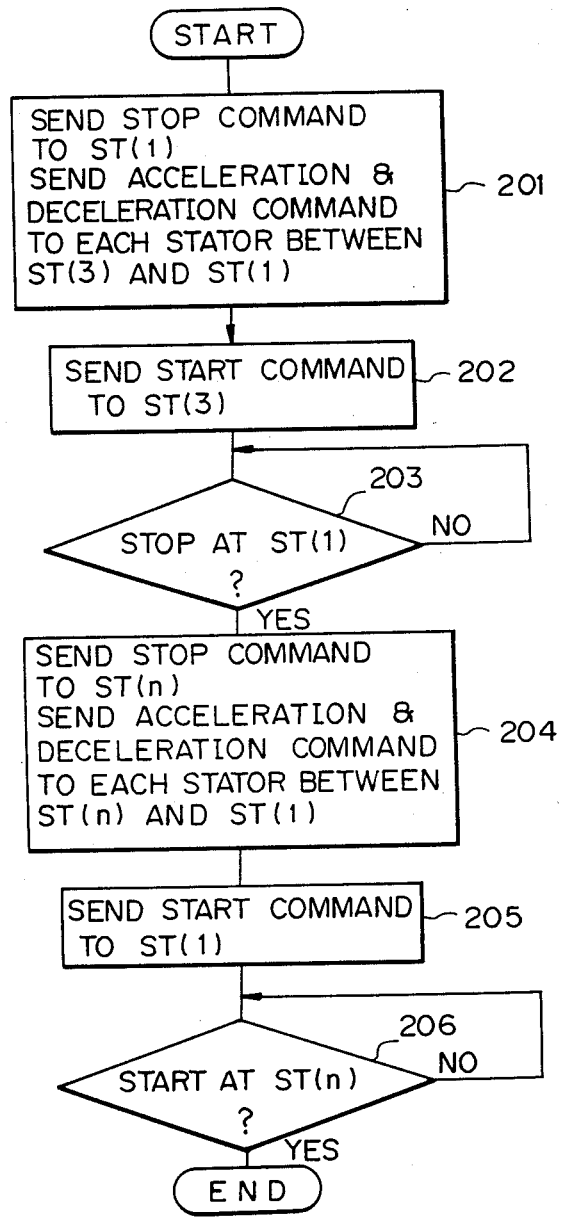
FIG. 20 is a flow chart illustrating in detail the seventh embodiment of the present invention.

FIG. 20 is a flow chart illustrating in detail the seventh embodiment of the method for controlling the carrier CR where the starting position is at the station ST(3) within the section V. At first, at step 201, the carrier controller 2 sends a stop command signal to the station ST(1) and sends acceleration or deceleration command signals to the stators between the station ST(3) and the station ST(1) (for example, the stator of the station ST(2)). Then, at step 202, a start command signal is transmitted to the station ST(3) to move the carrier CR to the station ST(1). After it is confirmed that the carrier CR is moved to the station ST(1) and stopped there at step 203, a stop command signal is sent at step 204, to the station ST(n) and acceleration or deceleration command signals are sent to the stators between the station ST(1) and the station ST(n). Then, at step 205, a start command signal is transmitted to the station ST(1) to move the carrier CR to the station ST(n). Finally, at step 206, stoppage of the carrier CR at the station ST(n) is confirmed, and the rising movement processing is terminated. By this processing, a sufficient approach distance can be given to the carrier CR, and the carrier CR can rise along the vertical conveyance path 10A with an upward force greater than the force of gravity.

Eighth Embodiment

The eighth embodiment is similar to the seventh embodiment.

Figure 21:
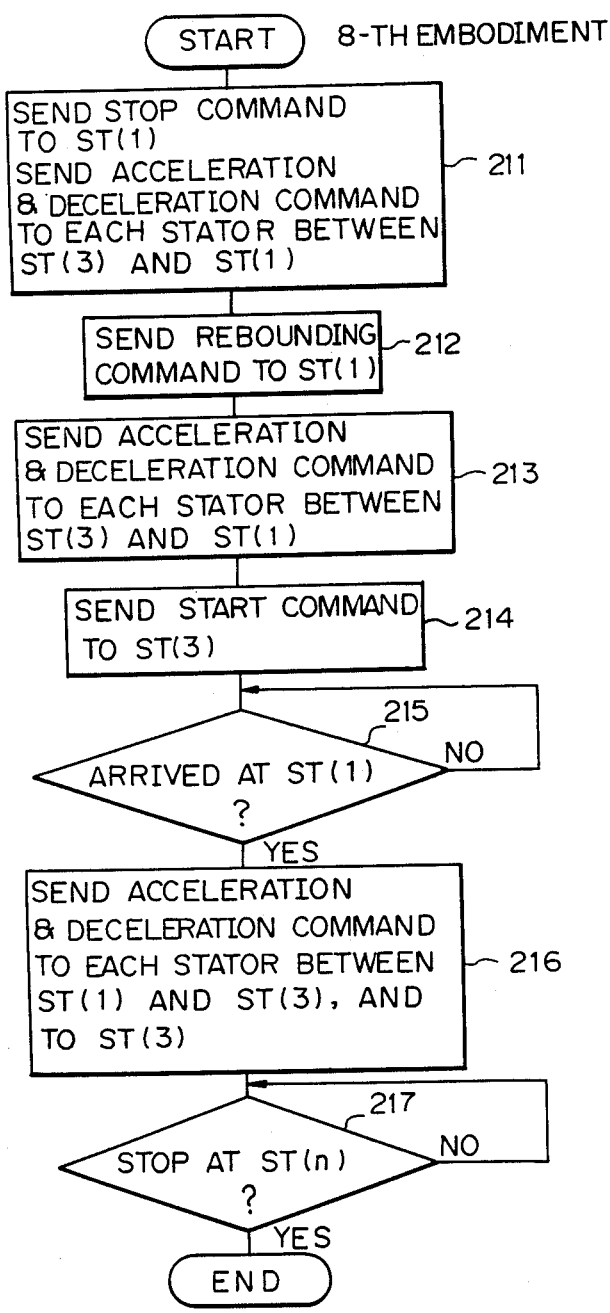
FIG. 21 is a flow chart explaining a rebound to obtain a sufficient rising speed, according to the eighth embodiment of the present invention.

FIG. 21 is a flow chart illustrating the eighth embodiment of the method for controlling the linear motor car system according to the seventh embodiment of the present invention. As in the preceding seventh embodiment, referring to FIG. 19, the carrier CR retreated to the station ST(1) is caused to rise to the station St(n). In the eighth embodiment, the carrier CR is not stopped at the station ST(1) but is rebounded at station ST(1) and immediately moved for another ascent.

More specifically, at step 211 in FIG. 21, the carrier controller 2 first sends a stop command signal to the station ST(n) and sends acceleration or deceleration command signals to the stations ST(3) through ST(n) and the stators in these stations. Then, at step 212, a rebounding command signal is sent to the station ST(1). On receipt of this rebounding command signal, after detection of the intrusion of the carrier CR, the station ST(1) continues reverse excitation to move the carrier CR in the reverse direction. The carrier controller 2 then sends, at step 213, acceleration or deceleration commands to the stations ST(3) through ST(1) and the stators in these stations. Then, at step 214, a start command signal is sent to the station ST(3) to move the carrier CR toward the station ST(1). When intrusion of the carrier CR into the station ST(1) is detected at step 215, acceleration or deceleration command signals are sent, at step 216, to the stations ST(1) through ST(3) and the stators in these stations to move the carrier CR toward the station ST(n). Stoppage of the carrier CR at the station ST(n) is confirmed at the step 217, and the ascending movement control processing is terminated. By thus rebounding the carrier CR at the station ST(1) to which the carrier CR is withdrawn, the moving time of the carrier CR is made shorter by the processing time required for stopping and starting than the moving time in the seventh embodiment. Of course, the position the station to which the carrier is withdrawn can be appropriately changed according to the weight of an article loaded on the carrier CR or other factors. The respective stations and stators can independently control the speed of the carrier CR according to instructions given from the carrier controller 2.

According to the seventh and eighth embodiment of the present invention for controlling a linear motor car system, if the approach distance of the carrier for the rising movement is insufficient, the carrier is once withdrawn to the position where a sufficient approach distance is obtained, and therefore, the carrier is allowed to intrude into the vertical conveyance path always at a sufficient speed. Accordingly, the control of the ascending movement of the carrier can be fully accomplished.

Ninth Embodiment

In any of the foregoing embodiments, the same motor is used for both the horizontal conveyance zone and the vertical conveyance zone and the same control method is adopted. In this case, the conveyance capacity of the system is determined based on the necessary conveyance capacity of the vertical conveyance zone. Accordingly, the horizontal conveyance zone has an excessive conveyance capacity larger than the necessary conveyance capacity. Namely, the horizontal conveyance zone wastefully consumes energy in an amount corresponding to the excess of the conveyance capacity, and the size and weight should be inevitably increased in proportion to the waste consumption of energy.

The ninth embodiment of the present invention is intended to solve this problem. Namely, it is an object of the ninth embodiment of the present invention to provide a linear motor type conveyance system in which horizontal and vertical conveyance zones have necessary and minimum conveyance capacities, respectively, the operation can be performed at a good energy efficiency, and the size and weight can be reduced.

According to the ninth embodiment of the present invention, the above-mentioned problem can be solved by satisfying the requirement of $E_h < E_v$ between the driving energies $E_h$ and $E_v$ given to the carrier by the motor in the horizontal conveyance zone and the vertical conveyance zone.

If the requirement of $E_h < E_v$ is satisfied, there is no wasteful consumption of energy in the horizontal conveyance zone while a driving energy necessary for the ascension of the carrier is obtained in the vertical conveyance zone, and the operation can be performed at a good energy efficiency.

Furthermore, since no excessive conveyance capacity is provided for the motor, the size and weight of the motor can be accordingly reduced.

(Examples of the ninth embodiment)

Figure 22:
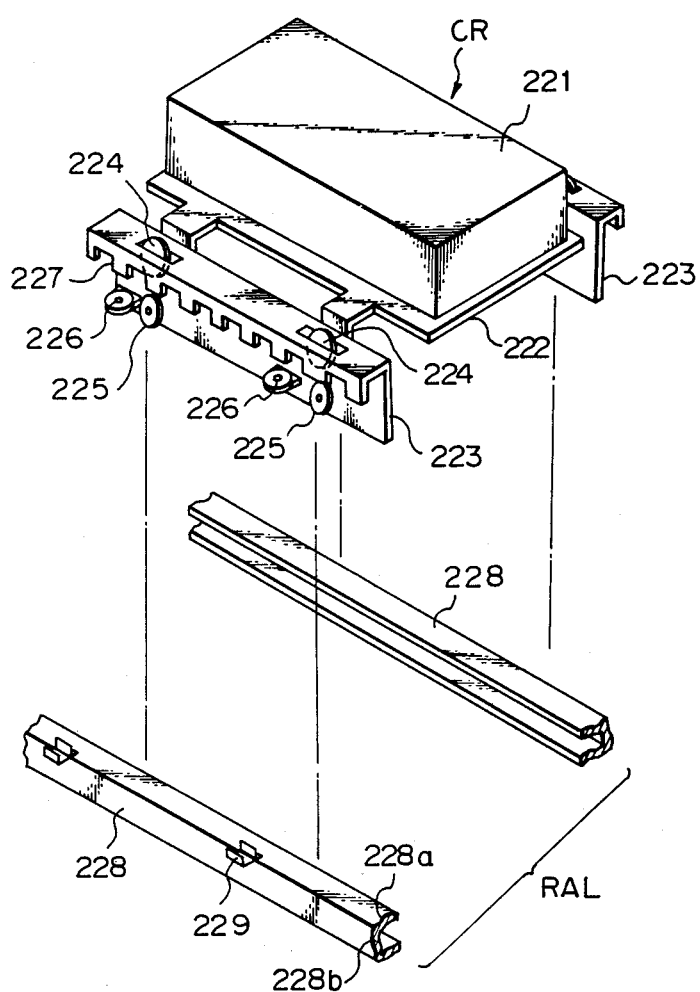
FIG. 22 is a perspective view of the structure of the main portion of the conventional linear motor car system.
Figure 23:
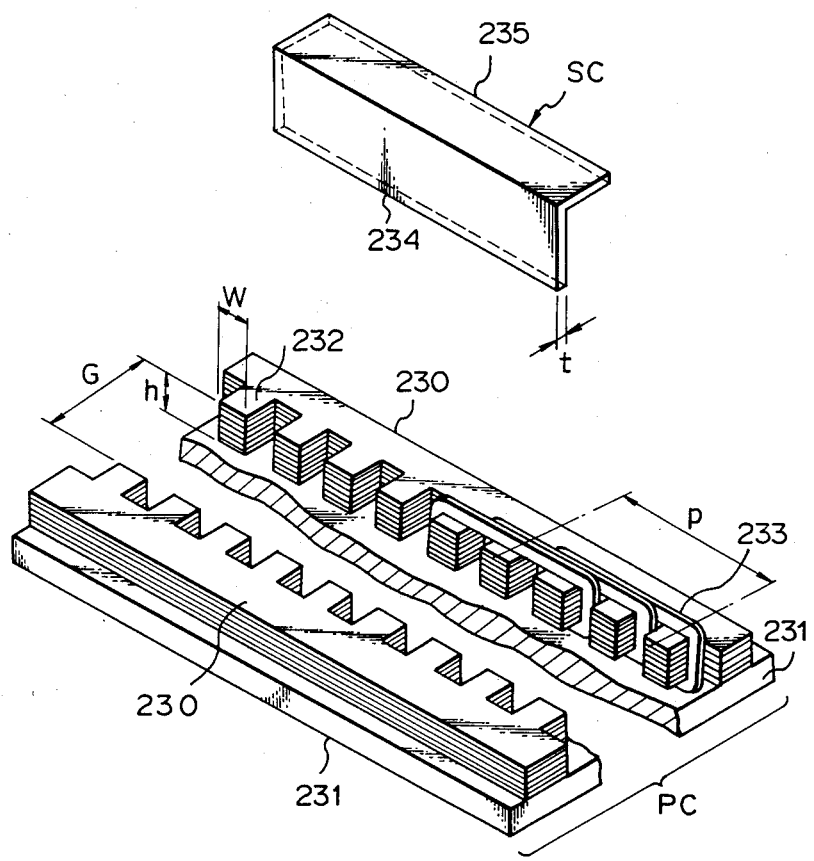
FIG. 23 is a perspective view of the structure of a linear motor car according to the ninth embodiment of the present invention.

(1) Basic Structure (FIGS. 22 and 23)

Although the structure of the main portion of the linear motor car system was already described with reference to FIGS. 3A through 3C, the basic structure will be again described from another point of view with reference to FIGS. 22 and 23 for better understanding of the ninth embodiment. In FIG. 22, CR represents for a carrier in which an article to be conveyed is loaded, and the carrier CR includes a lidded vessel 221 for containing the article therein, a base plate 222 on which the vessel 221 is placed and secured, frames 223 fixed to both the sides of the base plate 222, vertical guide rollers 224 and 225 arranged at front and rear two parts of the respective frames and lateral guide rollers 226 similarly arranged on the frames. Furthermore, RAL stands for a conveyance path along which the carrier CR is travelled, and the conveyance path RAL comprises a pair of left and right grooved rails 228. The carrier is attached so that the upper and lower longitudinal guide rollers 224 and 225 of the carrier CR grip upper flanges 228a of the rails 228 therebetween and the lateral guide rollers 226 are in contact with the inner side faces of webs of the rails 228, whereby the carrier CR can be travelled along the conveyance path RAL without leaving the rails 228. The side frame 223 of the carrier CR has a sawtooth-shaped portion 227, and the position and speed of the carrier CR can be detected by passage of the sawtooth-shaped portion 227 through a sensor 229.

FIG. 23 illustrates the structure of the linear motor for driving the carrier CR. The linear motor includes, in principle, a primary iron core PC which is the same as the iron core COR in FIG. 3C and a secondary conductor SC. The primary iron core PC includes a pair of left and right laminated cores 230, and the respective cores are secured to a single base 231 (for facilitating illustration, the base 231 is shown in the broken and expanded state). A coil 231 is wound on a magnetic pole 232 of the core 230. In the embodiment illustrated in the drawings, a three-phase alternating current driven motor is used, and one coil 233 is wound for every three magnetic poles and the coils 233 are wound in the state wherein they are staggered from each other by one magnetic pole. Namely, three magnetic poles 232 constitute one magnetic pole length while forming u-, v- and w-phases, respectively. In the drawings, P represents the magnetic pole pitch. The secondary conductor SC is formed of an L-shaped material, and reference numeral 234 represents the main part of the conductor passing through the gap G (for facilitating illustration, the gap is shown as broader than the actual gap) between the core magnetic poles of the primary iron core PC. Reference numeral 235 represents an attachment portion and reference symbol t indicates the thickness of the secondary conductor SC (especially, the main part 234 of the conductor). Furthermore, h and w indicate the height (laminate thickness) and width of the core magnetic pole 232, and the product of $h \times w = S$ corresponds to the area of the end face of the magnetic pole, that is, the area confronting the secondary conductor SC (especially, the main part 234 of the conductor).

The capacity of the linear motor is determined by the driving force and speed for the conveyance, and the larger the driving force and speed, the larger the driving energy given to the carrier. Accordingly, the driving energy can be increased by three methods, that is, increase of the driving force alone, increase of the speed alone, and increase of both the driving force and the speed, and each of these methods includes various embodiments.

One of the above-mentioned primary iron core PC and secondary conductor SC is arranged as the stator on the conveyance path RAL and the other is arranged as the moving element on the carrier CR. In the case of a secondary conductor movable type linear motor, the primary iron core PC is arranged as the stator on the conveyance path RAL and the secondary conductor SC is arranged as the moving element on the carrier CR. On the other hand, in the case of a primary iron core movable type linear motor, the secondary conductor SC is arranged as the stator on the conveyance path RAL and the primary iron core PC is arranged as the mover on the carrier CR. These two types will now be described in detail.

(2) Secondary Conductor Movable Type (FIG. 24)

FIG. 24 illustrates a secondary conductor movable type linear motor car system according to a first example of the ninth embodiment of the present invention. In FIG. 24, RAL represents for a conveyance path, V represents for a vertical conveyance zone and H stands for a horizontal conveyance zone. CR designates a carrier, M represents for a secondary conductor arranged as the moving element on the carrier CR, and $PC_H$ and $PC_V$ represent for primary iron cores arranged as the stator on the horizontal conveyance zone H and vertical conveyance zone V, respectively, of the conveyance path RAL.

In this example, as means for satisfying the requirement of $E_h < E_v$ in the driving energies $E_h$ and $E_v$ given to the carrier CR in the horizontal conveyance zone H and vertical conveyance zone V, respectively, there can be mentioned two contrivances, i.e., of the structure of the primary core (stator) and of electric control. These two means will now be described.

(2-1) Contrivance on Structure of Primary Iron Core (Stator)

According to this means, the requirement of $E_h < E_v$ is realized by making various parameters of the primary core PC, such as the area S ($=h \times w$) of the magnetic pole 232 confronting the main part 234 of the secondary conductor 235, the gap G between the magnetic poles, the magnetic pole pitch P, the saturation induction B, and the coil winding number N, shown in FIG. 23, in the primary iron core $PC_H$ in the horizontal conveyance zone different from those in the primary iron core $PC_V$ in the vertical conveyance path. Examples of the ninth embodiment will now be described with reference to the respective parameters.

Figure 25:
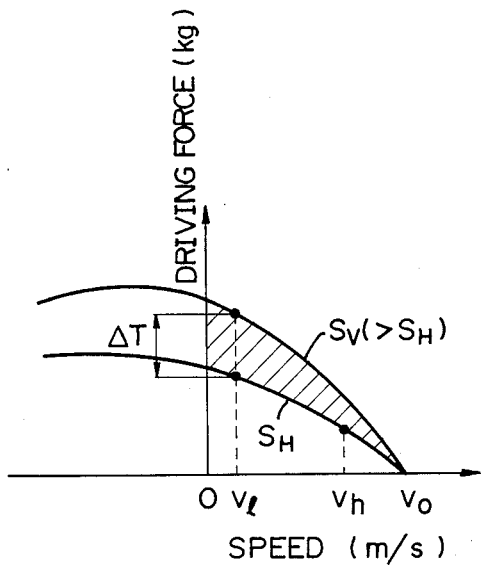
FIG. 25 is a diagram of the dependency of the speed-driving force on the confronting area (S) of the magnetic poles in the first example of the ninth embodiment.

(2-1-a) Area S Confronting Secondary Conductor (FIG. 25)

The areas $S_H$ and $S_v$ of the magnetic poles 232 of the primary iron cores $PC_H$ and $PC_v$ confronting the main part 234 of the secondary conductor are adjusted so that the requirement of $S_H < S_v$ is satisfied. As is apparent from the speed-driving force curve of FIG. 25, in all the speed region of from 0 to $V_0$, $S_v$ is larger by the hatched portion than $S_H$, where $V_0$ is the maximum speed.

This increase of the driving force is due mainly to an increase of the permeance of the magnetic pole, that is, an increase of the quantity of the magnetic flux, by an increase of the confronting area S. The increase of the confronting area S ($=h \times w$) can be attained by three methods, that is, an increase of the height h along, an increase of the width w alone, and an increase of both h and w. To attain the object of increasing the driving force, substantially similar effects can be attained by these three methods.

In this example, by this increase of the driving force, the driving energy for the carrier CR in the vertical conveyance zone V is increased and the successful ascent of the carrier CR becomes possible. Note, as is apparent from FIG. 26, increase of the driving force by $S_v$ over $S_H$ is larger as the speed is lower. Accordingly, the present embodiment is suitable for low-speed conveyance at a speed close to 0, rather than high-speed conveyance at a speed close to $V_0$ in the vertical conveyance zone V. For example, where an article to be conveyed is heavy, it is preferred that a large increase $\Delta T$ be utilized by performing conveyance at a higher speed $V_h$ close to $V_0$ in the horizontal conveyance zone H and at a lower speed Vl close to 0 in the vertical conveyance zone V.

If the requirement of $S_H < S_v$ is thus satisfied, necessary minimum driving energies can be given to the carrier CR in the horizontal conveyance zone H and vertical conveyance zone V, respectively, and the operation can be performed without a wasteful consumption of energy.

Moreover, if the requirement of $S_H < S_v$ is satisfied, the size and weight of the primary iron core $PC_H$ in the horizontal conveyance zone H can be made smaller than those of the primary iron core $PC_v$ in the vertical conveyance zone V.

Figure 26:
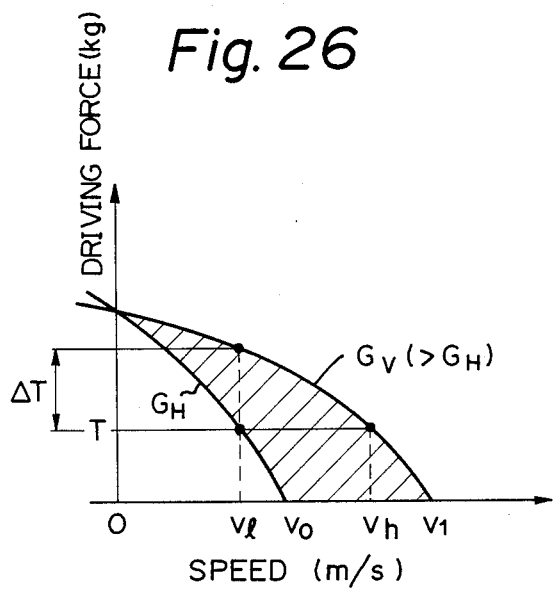
FIG. 26 is a diagram of the dependency of the speed-driving force on the gap (G) between magnetic poles in the first example of the ninth embodiment.

(2-1-b) Gap G between Magnetic Poles (FIG. 26)

The gaps $G_H$ and $G_v$ between magnetic poles in the primary iron cores $PC_H$ and $PC_v$ are controlled so that the requirement of $G_H < G_v$ is satisfied. As is apparent from the speed-driving curve of FIG. 26, in case of $G_v$, the running speed is increased as compared with the case of $G_H$, and the driving force is larger by the hatched portion within the entire speed range of from 0 to $V_1$ which is higher than $V_0$, where $V_0$ and $V_1$ are maximum speeds of the carrier in the case of $G_H$ and $G_v$, respectively.

These increases of the running speed and driving force are due mainly to reduction of the difference between the maximum value and minimum value of the variation of the magnetic flux density along the conveyance direction by an increase of the gap or due to a reduction of pulsation. Namely, since an increase of the gap G results in a broadening of the magnetic flux in each magnetic pole, the magnetic flux density per se is reduced (reduction of the maximum value) and the magnetic flux density is increased (increase of the minimum value) in the empty area between adjacent magnetic poles, and therefore, the amount of variation (pulsation) is reduced and the magnetic flux density is uniformalized, with the result that driving can be accomplished smoothly and the running speed and driving force are increased.

Increase of the gap G can be simply attained by changing the position of attachment of the core 230 to the base 231 (see FIG. 23). Practically, it is attained by exchanging the base 231 with another base.

In the present embodiment, by these increases of the running speed and driving force, the driving energy for the carrier CR is the vertical conveyance zone V can be increased and complete ascension of the carrier CR becomes possible. Note, as is apparent from FIG. 26, at the same speed Vl, the wider gap $G_v$ gives a driving force larger by $\Delta T$ than the driving energy given by the narrower gap $G_H$. At the same driving force T, $G_v$ gives a speed $V_h$ higher than the maximum speed $V_0$ given by $G_h$. Accordingly, the present embodiment is suitable for high-speed conveyance where the speed is preferential to the driving force in the vertical conveyance zone V. For example, conveyance is carried out at the speed Vl in the horizontal conveyance zone H and at the speed $V_h$ in the vertical conveyance zone V. The increase of kinetic energy, $m(V_h^2 - Vl^2)/2$ (m represents the mass of the carrier CR), attained by increase of the speed at this time produces a driving energy corresponding to the potential energy mgh (g represents the increase of the force of gravity) at the height h of the vertical conveyance zone V, and rising of the carrier CR becomes possible.

If the requirement of $G_H < G_v$ is thus satisfied, the driving energies in the horizontal conveyance zone H and vertical conveyance zone V can be controlled to necessary minimum levels, and therefore, the energy efficiency can be improved. The embodiment is additionally advantageous in that, in the vertical conveyance zone, conveyance can be performed at a higher speed than in the vertical conveyance zone.

Figure 27:
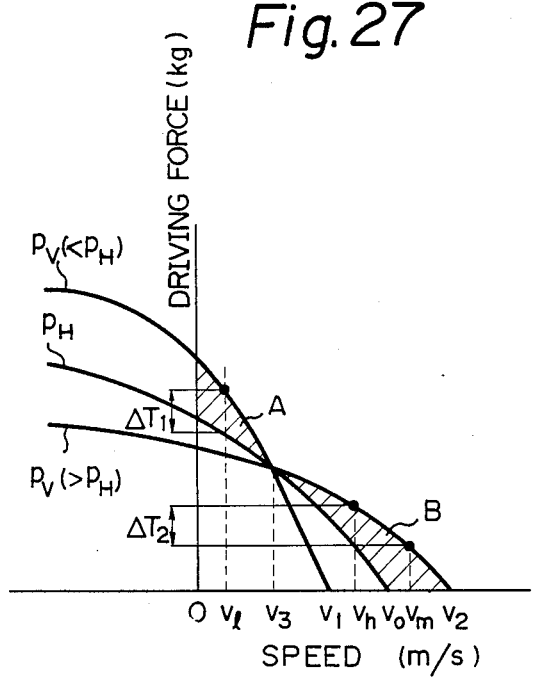
FIG. 27 is a diagram of the dependency of the speed-driving force on the pitch (P) of the magnetic poles in the first example of the ninth embodiment.

(2-1-c) Magnetic Pole Pitch P (FIG. 27)

The magnetic pole pitches $P_H$ and $P_v$ of the primary iron cores $PC_H$ and $PC_v$ are adjusted so that the requirement of $P_H \neq P_v$ is satisfied. The motor characteristics at the magnetic pole pitch $P_v$ are changed according to the large-or-small relation to $P_H$. As is apparent from the speed-driving force curve of FIG. 27, in case of $P_H > P_v$, the maximum speed $V_1$ when the pitch is smaller than the maximum speed $V_0$ when the pitch is $P_H$, and the driving force is increased in the speed range A of from 0 to $V_3$ but decreased within the speed range B of from $V_3$ to $V_1$. On the other hand, in the case of $P_H < P_v$, the maximum speed $V_2$ when the pitch is $P_v$ is larger than the maximum speed $V_0$ when the pitch is $P_H$, and the driving force is increased in the speed range B of from $V_3$ to $V_2$ but decreased within the speed range A of from $V_3$ to $V_2$ but decreased within the speed range A of from 0 to $V_3$.

In the present embodiment, by such increases of the driving force and running speed, the driving force for the carrier CR in the vertical conveyance zone V can be increased and rising of the carrier CR becomes possible. For example, as is apparent from FIG. 27, when driving force is preferred, the requirement of $P_H > P_v$ is satisfied, and the speed is set at V1 lower than $V_3$ and the increase $\Delta T_1$ of the driving force obtained by this control is utilized. On the other hand, when speed is preferred, the requirement of $P_H < P_v$ is satisfied, and the speed is set at $V_h$ higher than $V_3$ or $V_m$ higher than $V_h$ and the increase $\Delta T_2$ of the driving force of the increase $(V_m - V_h)$ of the speed is utilized.

Thus, if the requirement of $P_H > P_v$ ($P_H > P_v$ or $P_H < P_v$) is satisfied, the driving energies in the horizontal conveyance zone H and vertical conveyance zone V can be controlled to necessary minimum levels and the energy efficiency can be optimally improved. This example is additionally advantageous in that in the vertical conveyance zone, a high speed or a low speed is selectively set as the conveyance speed.

Where $P_H < P_v$, the size and weight of the primary iron core $PC_H$ in the horizontal conveyance zone H can be made smaller than those of the primary iron core $PC_v$ in the vertical conveyance zone V. To the contrary, in case of $P_H > P_v$, the size and weight of the primary iron core $PC_v$ can be made smaller than those of the primary iron core $PC_H$.

(2-1-d) Saturation Magnetic Flux Density (Core Material)

The requirement of $B_H < B_v$ is satisfied between the saturation magnetic flux density $B_h$ and $B_v$ of the cores 10 of the primary iron cores $PC_H$ and $PC_v$. This can be accomplished by appropriately selecting the core materials, for example, from vanadium permendure, silicon steel plate and iron.

As the core material of an alternating current motor, materials having a higher saturation magnetic flux density, a higher permeability, and a smaller core loss than iron, such as vanadium permendure and silicon steel plate, are ordinarily recommended in view of the required characteristics and a reduction of the size and weight.

However, these materials are more expensive than iron. Accordingly, even though a core material having good magnetic characteristics, such as vanadium permedure or silicon steel plate, is used for the iron core in the vertical conveyance zone V, iron is preferred because it is relatively low-cost although the magnetic characteristics ar lowered to some extent, (not only pure iron but also iron of the rolled steel plate level can be used) be used for the iron core in the horizontal conveyance zone H. In this case, an optimum driving energy can be provided at a low cost.

(2-1-e) Coil Winding Number N

The requirement of $N_H < N_v$ is satisfied between the winding numbers $N_h$ and $N_v$ of coils 13 of the primary iron cores $PC_H$ and $PC_v$, whereby the driving force in the vertical conveyance zone V can be increased over the driving force in the horizontal conveyance zone H and rising of the carrier CR becomes possible.

If the requirement of $N_H < N_v$ is thus satisfied, the driving energies in the horizontal conveyance zone H and vertical conveyance zone V can be controlled to necessary minimum levels and the energy efficiency can be improved.

Furthermore, if the requirement of $N_H < N_v$ is satisfied, the coil weight of the primary iron core $PC_H$ in the horizontal conveyance zone can be reduced, and a weight-decreasing effect can be attained.

(2-2) Electric Control

The current value I or frequency F of the exciting current applied to the coil of the primary iron core PC is made different between the primary iron core $PC_H$ in the horizontal conveyance zone and the primary iron core $PC_v$ in the vertical conveyance zone to realize the relation of $E_H < E_v$. This means will now be described with reference to respective examples.

(2-2-a) Current Value I

The requirement of $I_H < I_v$ is satisfied between the values $I_H$ and $I_v$ currents applied to the coils 13 of the primary iron cores $PC_H$ and $PC_v$, whereby the driving force in the vertical conveyance zone V can be increased over the driving force in the horizontal conveyance zone H and rising of the carrier CR becomes possible.

Thus, if the requirement of $I_H < I_v$ is satisfied, the driving energies in the horizontal conveyance zone H and vertical conveyance zone V can be controlled to necessary minimum levels and the energy efficiency can be improved.

(2-2-b) Frequency F

The requirement of $F_H < F_v$ is satisfied between the frequencies $F_H$ and $F_v$ of electric currents applied to the coils 13 of the primary iron cores $PC_H$ and $PC_v$, whereby the running speed (maximum speed) and driving force in the vertical conveyance zone V can be increased and rising of the carrier becomes possible.

Thus, if the requirement of $F_H < F_v$ is satisfied, the conveyance energies in the horizontal conveyance zone H and vertical conveyance zone V can be controlled to necessary minimum levels and the energy efficiency can be improved.

Figure 28:
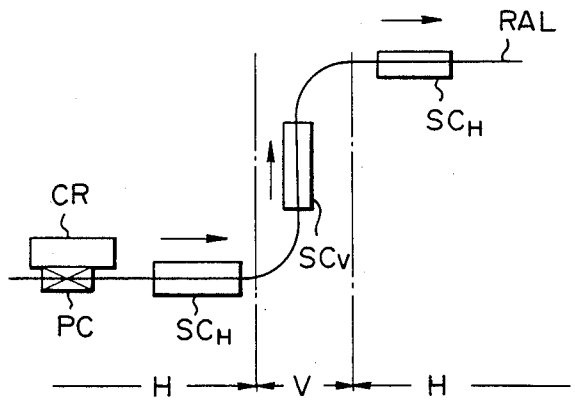
FIG. 28 is a diagram of the structure of a secondary conductor movable type linear motor car system according to a second example of the ninth embodiment of the present invention.

(3) Primary Iron Core Movable Type (FIG. 28)

FIG. 28 illustrates a primary iron core movable type linear motor conveyance system according to a second embodiment of the present invention. As in the example shown in FIG. 24, RAL represents a conveyance path, H represent a horizontal conveyance zone, V designates a vertical conveyance zone V, and CR designates a carrier. PC represents a primary iron core arranged as a moving element on the carrier CR, and $SC_H$ and $SC_v$ represent secondary conductors arranged in the horizontal conveyance zone H and vertical conveyance zone V, respectively, of the conveyance path RAL.

In this example, as means for satisfying the requirement of $E_H < E_v$ between the driving energies $E_H$ and $E_v$ given to the carrier CR in the horizontal conveyance zone H and vertical conveyance zone V, a contrivance on the structure of the secondary conductor and electric control can be adopted. These means will now be described.

(3-1) Contrivance on Structure of Secondary Conductor

The parameters of the secondary conductor SC, that is, the thickness t shown in FIG. 23 and the conductivity $\sigma$, are made different between the secondary conductor $SC_H$ in the horizontal conveyance zone and the secondary conductor $SC_v$ in the vertical conveyance zone, so that the relationship $E_H < E_v$ is realized. Respective embodiments will now be described.

Figure 29:
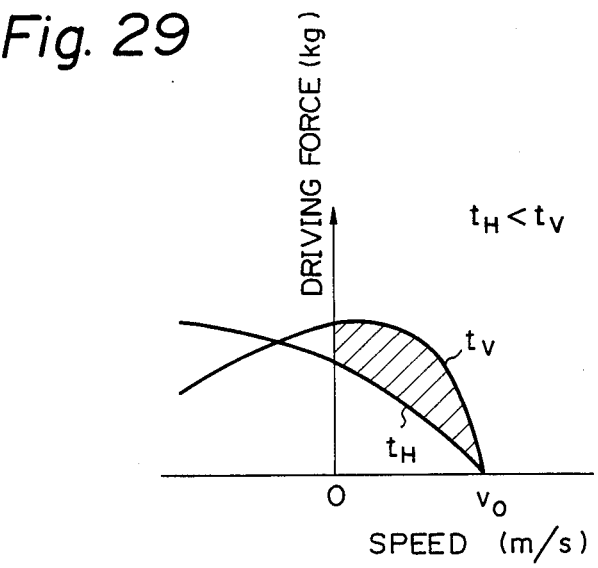
FIG. 29 is a diagram of the dependency of the speed-driving force on the thickness (t) of the primary conductor in the second example of the ninth embodiment.

(3-1-a) Thickness t (FIG. 29)

The requirement of $T_H < T_v$ is satisfied between the thicknesses $T_H$ and $T_v$ of the secondary conductors $SC_H$ and $SC_v$. As shown in FIG. 29, when the thickness is $T_v$, the driving force is larger in the speed range of from 0 to $V_0$ by the hatched portion than the case when the thickness is $T_H$. Accordingly, the driving force in the vertical conveyance zone V is increased over the driving force in the horizontal conveyance zone H and rising of the carrier CR becomes possible.

Thus, if the requirement of $T_H < T_v$ is satisfied, the driving energies in the horizontal conveyance zone H and vertical conveyance zone V can be controlled to necessary minimum levels, and the energy efficiency can be improved.

Furthermore, by satisfying the requirement of $T_H < T_v$, the weight of the secondary conductor $SC_H$ in the horizontal conveyance zone can be reduced.

Note, in this example, as is apparent from FIG. 29, the thinner the thickness T, the more the peak of the driving force shifts toward the side of the negative speed. This results in an additional advantage of an increase of the braking force (negative speed) at the time of reduction of the conveyance speed or stopping of the conveyance in the horizontal conveyance zone H. Furthermore, if in the horizontal conveyance zone H the thickness is increased at the starting or accelerating portion and the thickness is reduced at the decelerating or stopping portion, the conveyance efficiency can be further enhanced.

Figure 30:
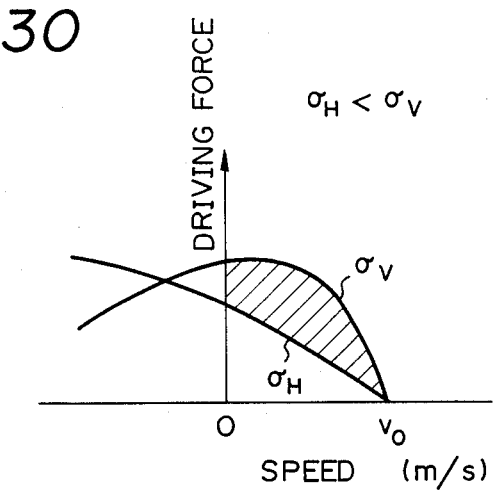
FIG. 30 is a diagram of the dependency of the speed-driving force on the conductivity ($\sigma$) of the primary conductor in the second example of the ninth embodiment.

(3-1-b) Conductivity $\sigma$ (FIG. 30)

The requirement of $\sigma_H < \sigma_v$ is satisfied between the conductivities $\sigma_H$ and $\sigma_v$ of the secondary conductors $SC_H$ and $SC_v$. This can be accomplished by preparing the secondary conductors $SC_H$ and $SC_v$ from materials differing in conductivity, for example, Al and Cu, respectively. As shown in FIG. 30, when the conductivity is $\sigma_v$, the driving force is larger in the speed range of from 0 to $V_0$ by the hatched proportion than the driving force in case of $\sigma_H$. Namely, the driving force in the vertical conveyance zone V is increased over the driving force in the horizontal conveyance zone H and rising of the carrier CR becomes impossible.

Thus, if the requirement of $\sigma_H < \sigma_v$ is satisfied, the driving energies in the horizontal conveyance zone H and vertical conveyance zone V can be controlled to necessary minimum levels, and the energy efficiency can be improved.

Also in the present example, as shown in FIG. 30, the smaller the conductivity $\sigma$, the more the peak of the driving force shifts toward the side of the negative speed. Accordingly, as in the example described in (3-1-a) above, there can be attained an additional advantage of an increase of the braking force at the time of reduction of the conveyance speed or stopping of the conveyance in the horizontal conveyance zone H. Accordingly, if in the horizontal conveyance zone H the conductivity $\sigma$ is reduced at the decelerating or stopping portion, the conveyance efficiency can be further increased.

(3-2) Electric Control

As in the case of the secondary conductor movable type described in (2-2) above, by making the current value I or frequency F of the exciting current applied to the coil of the primary iron core PC (moving element) different between the horizontal conveyance zone H and vertical conveyance zone V, the relation of $E_H < E_v$ is realized. Respective examples will now be described.

(3-2-a) Current Value I

The requirement of $I_H < I_v$ is satisfied between the values $I_H$ and $I_v$ of the currents supplied to the coils 233 of the primary iron cores PC in the horizontal conveyance zone H and the vertical conveyance zone V, whereby the driving force in the vertical conveyance zone V is increased over the driving force in the horizontal conveyance zone H and rising of the carrier CR becomes possible.

Thus, if the requirement of $I_H < I_v$ is satisfied, the driving energies in the horizontal conveyance zone H and vertical conveyance zone V can be controlled to necessary minimum levels, and the energy efficiency can be improved.

(3-2-b) Frequency F

The requirement of $F_H < F_v$ is satisfied between the frequencies $F_H$ and $F_v$ of the currents applied to the coils 233 of the primary iron cores PC in the horizontal conveyance zone H and vertical conveyance zone V, whereby the running speed (maximum speed) and driving force in the vertical conveyance zone V are increased over those in the horizontal conveyance zone H and rising of the carrier CR becomes possible.

Thus, if the requirement of $F_H < F_v$ is satisfied, the driving energies in the horizontal conveyance zone H and vertical conveyance zone V can be controlled to necessary minimum levels, and the energy efficiency can be improved.

As is apparent from the foregoing examples, in the linear motor type conveyance system according to the ninth embodiment of the present invention, by satisfying the requirement of $E_H < E_v$ between the driving energies $E_H$ and $E_v$ given to the carrier in the horizontal conveyance and vertical conveyance zone, the driving energies in the horizontal conveyance zone and vertical conveyance zone can be set at necessary minimum levels, and therefore, the operation can be performed efficiently without wasteful consumption of energy and the energy efficiency can be improved.

Furthermore, since the driving energies can be set at necessary minimum levels, an excessive capacity need not be given to the motor and the size and weight of the motor can be reduced. By contrivance on the structure (S, G, P and N) of the primary iron core (stator) in the first example (secondary conductor movable type) or by contrivance on the structure (T) of the secondary conductor of the second example (primary iron core movable type), the size and weight can be especially effectively reduced.

What is claimed is:

1. A linear motor car system for driving a carrier comprising:

a conveyance path;

a linear motor having a moving element attached to the carrier and a plurality of stators dispersedly arranged along said conveyance path; and a control unit for driving and controlling said linear motor, the carrier being driven to run along said conveyance path by exciting said stators and being moved by an inertial force between adjacent stators, said conveyance path comprising a lower horizontal conveyance path, an upper horizontal conveyance path, a vertical conveyance path, a lower curved conveyance path for connecting said vertical conveyance path and said lower horizontal conveyance path, and an upper curved conveyance path for connecting said vertical conveyance path and said upper horizontal conveyance path, at least one of said stators being arranged on an end portion of one of said lower horizontal conveyance path, said vertical conveyance path and said upper horizontal conveyance path, said end portion of said lower horizontal conveyance path being connected to said lower curved conveyance path, said end portion of said upper horizontal conveyance path being connected to said upper curved conveyance path, and said end portion of said vertical conveyance path being connected to one of said lower curved conveyance path and said upper curved conveyance path so that said carrier is movable through respective ones of said lower curved conveyance path and said upper curved conveyance path by the inertial force.

2. A linear motor car system as claimed in claim 1 wherein at least one of said stators is arranged on said vertical conveyance path.

3. A linear motor car system as claimed in claim 2, wherein said control unit has means for generating a control signal supplied to said stators so that only an upward driving force is generated in said moving element when said carrier is running along said vertical conveyance path.

4. A linear motor car system as claimed in claim 1, wherein each of said stators comprises a primary coil having plural phases of coils, and a switching means connected between said primary coil and said control unit, for switching, in response to said control signal, the phases of an A.C. power supply voltage to be supplied to said plural phases of coils, the control signal supplied from said control unit to said at least one of said stators arranged on said vertical path being a single direction control signal so that only an upward direction driving force is generated in said moving element by an interaction between said at least one of said stators and said moving element.

5. A linear motor car system as claimed in claim 4, wherein said moving element is a secondary conductor plate of said linear motor.

6. A linear motor car system as claimed in claim 1, wherein said control unit comprises a discriminating means for discriminating whether or not said carrier rising along said vertical conveyance path will be able to rise completely through said vertical conveyance path, and comprises a gradual descent control means for driving said carrier to gradually descend along said vertical conveyance path when said discriminating means discriminate that said carrier cannot rise completely through said vertical conveyance path.

7. A linear motor car system as claimed in claim 6, wherein said discriminating means comprises;

a rising speed detecting means for detecting the rising speed of said carrier rising along said vertical conveyance path, a table means for storing predetermined reference speed values, a comparing means for comparing the detected rising speed with the corresponding one of said predetermined reference speed values, whereby when the detected rising speed is smaller than the corresponding reference speed value, said gradual descent control means controls said at least one of said stators arranged on said vertical conveyance path so that said carrier receives an upward direction force smaller than the force of gravity acting on said carrier.

8. A linear motor car system as claimed in claim 6, wherein said discriminating means comprises;

a rising acceleration detecting means for detecting the rising acceleration of said carrier rising along said vertical conveyance path, a table means for storing predetermined reference acceleration values, a comparing means for comparing the detected rising acceleration with the corresponding one of said predetermined reference acceleration values, whereby when the detected rising acceleration is smaller than the corresponding predetermined reference acceleration value, said gradual descent control means controls said at least one of said stators arranged on said vertical conveyance path so that said carrier receives an upward direction force smaller than the force of gravity acting on said carrier.

9. A linear motor car system as claimed in claim 7 further comprising carrier-detecting sensors attached to the upper end portion and the lower end portion of each of said stators arranged on said vertical conveyance path, said rising speed detecting means detecting the speed of said carrier by detecting the time period during ON and OFF of each of said sensors.

10. A linear motor car system as claimed in claim 8 further comprising carrier-detecting sensors attached to the upper end portion and the lower end portion of each of said stators arranged on said vertical conveyance path, said rising acceleration detecting means detecting the acceleration of said carrier by detecting the time period during ON of one of said sensors and ON of another of said sensors.

11. A linear motor car system as claimed in claim 3 wherein said control unit comprises abnormal descent detecting means for detecting whether or not said carrier erroneously intrudes from said upper horizontal conveyance path to said vertical conveyance path, and comprises exciting means for exciting said stators disposed along said vertical conveyance path so that said carrier is braked when said abnormal descent detecting means detects the erroneous intrusion of said carrier.

12. A linear motor car system as claimed in claim 1, wherein said control unit comprises a failure to rise detecting means for detecting a failure to rise of said carrier rising along said vertical conveyance path, and a driving means for driving said carrier so as to intrude again into said vertical conveyance path at a speed higher than the speed of the intrusion into said vertical conveyance path at the time of the failure to rise.

13. A linear motor car system as claimed in claim 3, wherein said control unit comprises a starting position detecting means for detecting whether or not the starting position of said carrier is within a predetermined approach section on said lower horizontal conveyance path, and comprises a withdrawal means for withdrawing said carrier to a position where at least a predetermined minimum approach distance can be obtained, when said carrier is within said predetermined approach section.

* * * * *

UNITED STATES PATENT AND TRADEMARK OFFICE
CERTIFICATE OF CORRECTION

PATENT NO. : 4,849,664
DATED : July 18, 1989
INVENTOR(S) : TOSHIMASA MIYAZAKI et al.

It is certified that error appears in the above-identified patent and that said Letters Patent is hereby corrected as shown below:

Column 2, line 54, delete "rise".

Column 10, line 33, "1" should be --①--;

line 40, "2" should be --②--.

Column 13, line 1, delete "ascending" and insert --the ascension--;

line 18, delete "the".

Column 14, line 33, "to" (2nd occurance) should be --so--.

Column 18, line 28, "at" (2nd occurance) should be --as--.

Signed and Sealed this

Fourteenth Day of January, 1992

Attest:

HARRY F. MANBECK, JR.

*Attesting Officer*      *Commissioner of Patents and Trademarks*